(12) United States Patent
Sugino et al.

(10) Patent No.: US 6,948,657 B2
(45) Date of Patent: Sep. 27, 2005

(54) DOCUMENT VERIFICATION SYSTEM

(75) Inventors: Hajime Sugino, Ashigarakami-gun (JP);
Kensuke Ito, Ashigarakami-gun (JP);
Tadashi Shimizu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 279 days.

(21) Appl. No.: 10/409,147

(22) Filed: Apr. 9, 2003

(65) Prior Publication Data
US 2004/0079800 A1 Apr. 29, 2004

(30) Foreign Application Priority Data
Oct. 29, 2002 (JP) ........................................ 2002-315083

(51) Int. Cl.[7] ................................................ G06K 5/00
(52) U.S. Cl. ........................................ 235/436; 235/380
(58) Field of Search ................................ 235/436, 474, 235/456, 379, 380; 380/285, 37, 45; 713/176, 186

(56) References Cited

U.S. PATENT DOCUMENTS

| 4,298,859 A | * | 11/1981 | Feilchenfeld | ................ 235/456 |
| 4,357,596 A | * | 11/1982 | Feilchenfeld | ................ 235/436 |
| 5,570,465 A | * | 10/1996 | Tsakanikas | ................ 358/1.15 |
| 6,011,849 A | * | 1/2000 | Orrin | ........................... 380/42 |
| 6,092,732 A | | 7/2000 | Curry | ........................ 235/434 |
| 6,360,011 B1 | * | 3/2002 | Katsumata et al. | ......... 382/181 |
| 6,567,546 B1 | * | 5/2003 | Eguchi et al. | .............. 382/181 |

FOREIGN PATENT DOCUMENTS

| JP | A 5-101089 | 4/1993 |
| JP | A 8-241451 | 9/1996 |
| JP | A 11-261806 | 9/1999 |
| JP | A 2000-95982 | 4/2000 |

* cited by examiner

*Primary Examiner*—Thien M. Le
(74) *Attorney, Agent, or Firm*—Oliff & Berridge, PLC

(57) ABSTRACT

The present invention provides a document verification system capable of verifying whether a document is an original at low cost and with ease. A terminal device acquires, as a registered feature vector feature information indicating a feature of a nonreproducible disorder portion in a printing region on a document serving as the original, and stores the registered feature vector on a hard disk via the Internet. A server acquires, as a calculated feature vector the same information as the registered feature vector in a document to be verified as to whether the document is the original, reads out the registered feature vector from the hard disk, compares the acquired calculated feature vector with the read out registered feature vector, and verifies whether the document to be verified is the original on the basis of a result of the comparison.

19 Claims, 28 Drawing Sheets

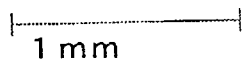
1 mm 1 mm 1 mm 1 mm

FIG. 8

| DID | FEATURE INFORMATION | CONDITION INFORMATION | SID |
|---|---|---|---|
| 1234567890 | X1234567890 | 1,23,456,78,90,98,7 | 784331 |
| 1234567891 | X1234567891 | 1,23,456,789,01,32 | 987452 |
| 1234567892 | X1234567892 | 1,23,456,789,01,32 | 987452 |
| . | . | . | . |
| . | . | . | . |
| . | . | . | . |

| SID | INSTALLATION PLACE INFORMATION | CONDITION INFORMATION |
|---|---|---|
| 12345678 | A CORPORATION, CHIYODA WARD, THE CITY OF TOKYO | 1,23,456,78,90,98.7 |
| 12345679 | B CORPORATION, YOKOHAMA CITY, KANAGAWA PREFECTURE | 1,23,456,789,01,32 |
| 12345680 | C CORPORATION, SETAGAYA WARD, THE CITY OF TOKYO | 1,23,456,789,01,32 |
| . . . | . . . | . . . |

DB2

F I G. 10
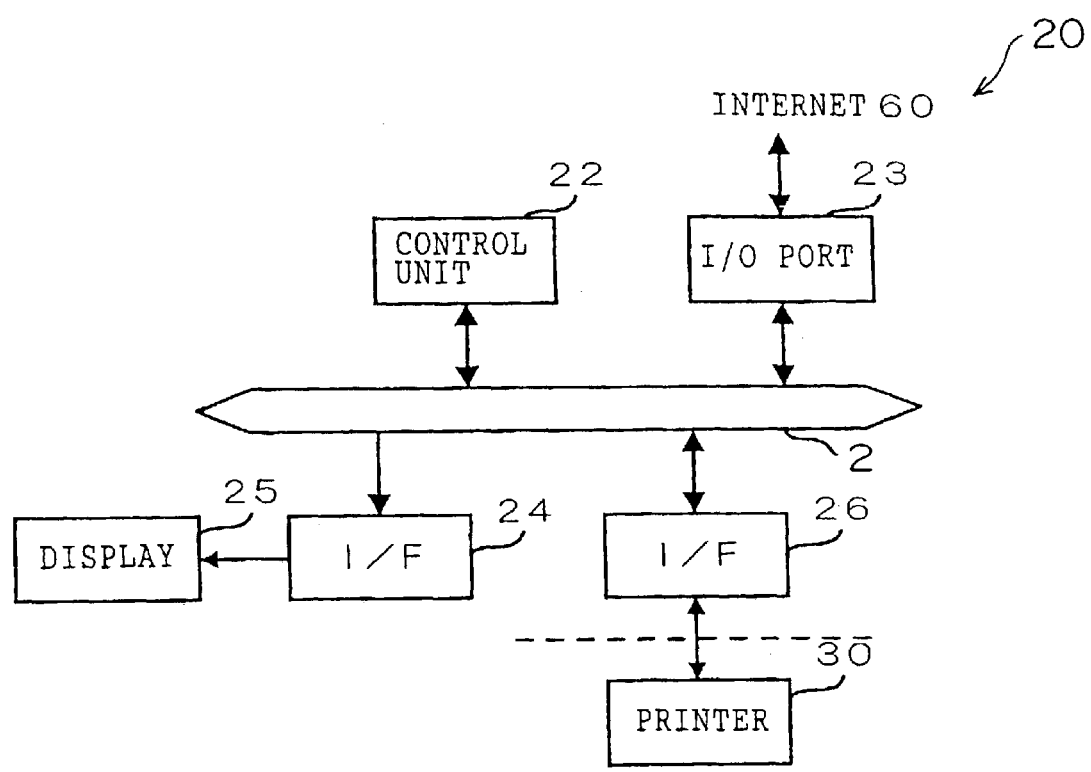

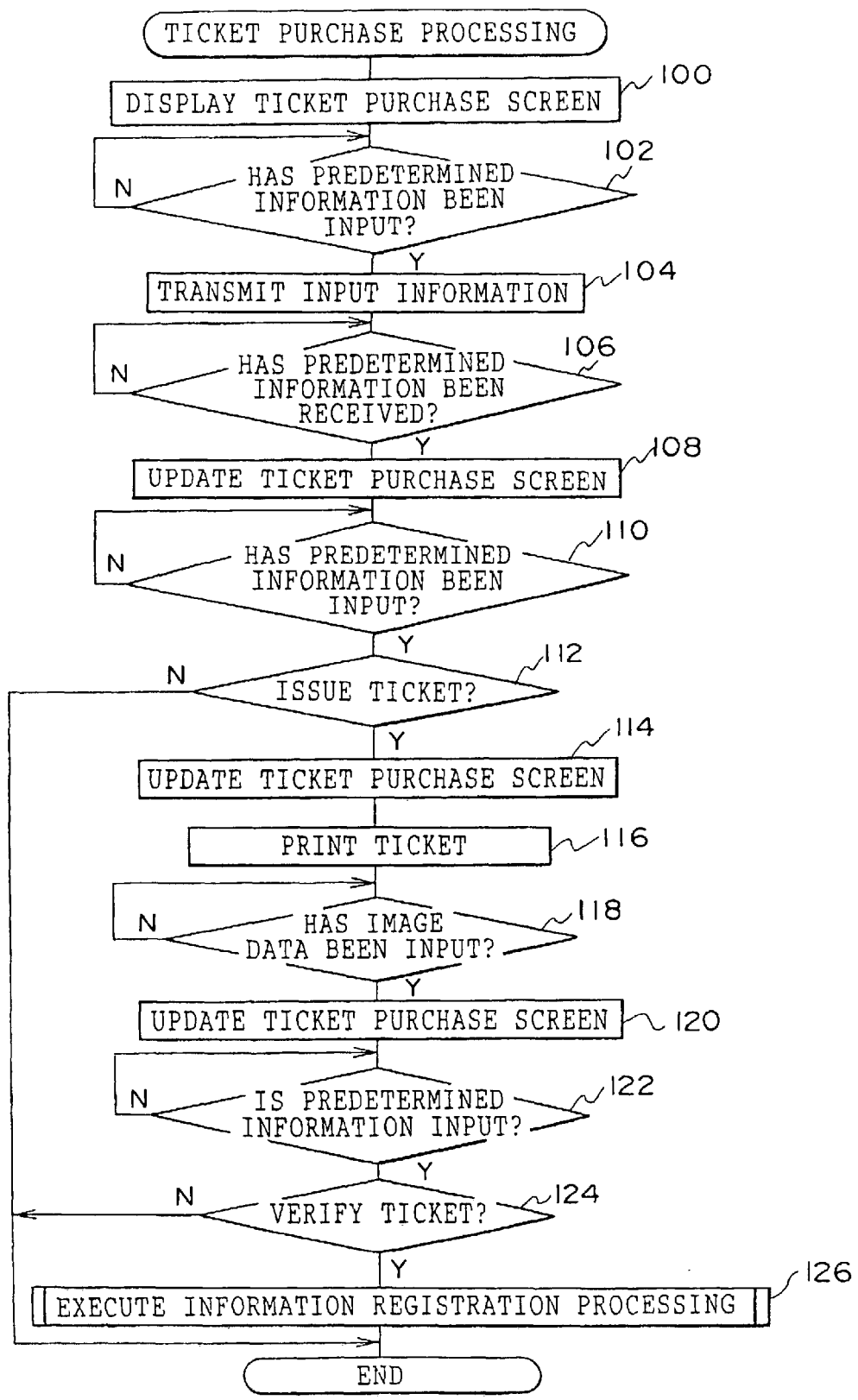

FIG.15A

TICKET PURCHASE

CONCERT NAME    ●●● CONCERT
SEAT KIND    S SEAT
CREDIT CARD NO.    1122334455

[ END ]

FIG.15B

TICKET PURCHASE

[ ISSUE TICKET ]    [ CANCEL ISSUANCE ]

THE FOLLOWING TICKET HAS BEEN OBTAINED
●●● CONCERT
SEAT: S SEAT 1-15    PLACE: xx HALL
DATE AND HOUR: DECEMBER 31 (TUESDAY), 2002
               FROM 18:00 (APPROX. 2 HOURS)

FIG.15C

TICKET PURCHASE

[ ISSUE TICKET ]    [ CANCEL ISSUANCE ]

TICKET IS NOW BEING PRINTED

FIG.15D

TICKET PURCHASE

[ ISSUE TICKET ]    [ CANCEL ISSUANCE ]

⇩

[ VERIFY TICKET ]    VERIFY CONTENTS OF PRINTED TICKET, AND PRESS "VERIFY TICKET" BUTTON IF THERE ARE NO PROBLEMS

DOCUMENT VERIFICATION SYSTEM

BACKGROUND OF THE INVENTION

1. Field of the Invention

The present invention relates to a document verification system, a document verification method, an information registration device, a recording medium having an information registration instruction recorded thereon, a document verification device, a recording medium having a document verification instruction recorded thereon, and a document verification database. In particular, the invention relates to a document verification system and a document verification method for verifying whether or not a document is the original, an information registration device used in the document verification system, a recording medium having an information registration instruction recorded thereon, a document verification device, a recording medium having a document verification instruction recorded thereon, and a document verification database.

2. Description of the Related Art

In order to prevent counterfeiting, it is necessary to conduct special processes on a document, which has value in being original, such as paper documents like securities, various certificates of title, insurance policies, resident cards, birth certificates, written guarantees, passports, bank bills and secret papers, and ID cards.

Conventionally, therefore, there are techniques for counterfeit prevention using special paper and printing a mark or a pattern in a note issue system using a facsimile machine (see, for example, Japanese Patent Application Laid-Open (JP-A) No. 5-101089), techniques of using special magnetic ink for preventing counterfeit using a copying machine (see, for example, JP-A No. 2000-95982), techniques of mixing a document with an optical semiconductor for preventing counterfeit (reproduction) of a bill or a security (see, for example, JP-A No. 8-241451), and techniques of embedding invisible information by using special halftone printing (see, for example, JP-A No. 11-261806).

On the other hand, in a highly information-oriented society, a situation in which content contained in the above described various documents is electronized (namely, processed so as to be usable by a computer and the like), printed and utilized is imagined. Therefore, it is thought that a situation in which an ordinary user gets the electronized content via a network such as the Internet, prints the electronized content by using an arbitrary printer, and uses the printed matter as a security or a certificate document, will increase. Therefore, it is expected that in the near future a technique, with which it can be verified with certainty whether a document printed by a printer is the original, will be demanded.

Therefore, applying each of the techniques described in JP-A Nos. 5-101089, 2000-95982, 8-241451, and 11-261806 as the above-mentioned techniques have been considered. In other words, when the technique described in JP-A No. 5-101089 is applied, whether a document is the original or not is verified on the basis of the kind of paper used for the document to be verified or the state of the printed mark or pattern. When the technique described in JP-A No. 2000-95982 is applied, whether a document is the original or not is verified on the basis of the state of magnetic ink used for printing. When the technique described in JP-A No. 8-241451 is applied, whether a document is the original or not is verified on the basis of whether there is an optical semiconductor mixed with the document. When the technique described in JP-A No. 11-261806 is applied, whether a document is the original or not is verified on the basis of the state of the embedded invisible information.

However, when each of the techniques described in JP-A Nos. 5-101089, 2000-95982, 8-241451, and 11-261806 is applied in order to verify whether a document printed by a printer is the original, it is necessary to conduct special processing on a document to be verified and this results in the problems of high cost and complicated processing.

SUMMARY OF THE INVENTION

In order to solve the problem, the present invention has been made. An object of the invention is to provide a document verification system and a document verification method for verifying that a document is the original with a low cost and with ease, an information registration device, a recording medium having an information registration instruction recorded thereon, a document verification device, a recording medium having a document verification instruction recorded thereon, and a document verification database.

In order to achieve the object, a first aspect of the invention provides a document verification system for verifying whether a document is an original, the system including: an information storage device; an information registration device, including a registration information acquisition component for acquiring, as registration information, at least one of feature information, indicating a feature of a nonreproducible disorder portion in a printing region on a document serving as an original, and state information, indicating at least one of a surface state and a thickness-expressing spots state, in a non-printing region on the document, and a storage processing component for storing the registration information acquired by the registration information acquisition component in the information storage device; and a document verification device including an verification information acquisition component, for acquiring, as verification information, information corresponding to the registration information in the document to be verified, a readout component for reading out the registration information from the information storage device, and an verification component for comparing the verification information acquired by the verification information acquisition component with the registration information read out by the readout component and verifying whether the document to be verified is the original on the basis of a result of the comparison.

According to the document verification system of the first aspect, in an information registration device, a registration information acquisition component acquires feature information indicating a feature of a nonreproducible disorder portion in a printing region on a document serving as an original and/or state information indicating a surface state and/or a thickness-expressing spots state in a non-printing region on the document as registration information. And a storage processing component stores the registration information acquired by the registration information acquisition component in the information storage device. Herein, the nonreproducible disorder portion is a microscopic image disorder that is contained in an image recorded on a recording medium such as paper and that could not be controlled when recording the image, such as the scattering state of an image forming material on a document generated when recording the image on the document, the state of nonuniform penetration, incomplete shape reproduction, and microscopic nonuniformity of the image forming material at the time of low coverage ratio. The document may be a printed matter having an image recorded thereon by printing or a hand written document. The document may be a paper medium or a resin medium.

On the other hand, when a document verification device in the invention verifies whether a document is the original, an verification information acquisition component acquires information corresponding to the registration information in a document to be verified as to whether the document is an original, as verification information. In addition, a readout component reads out the registration information from the information storage device, and an verification component compares the verification information acquired by the verification information acquisition component with the registration information read out by the readout component and verifies whether the document to be verified is the original on the basis of a result of the comparison.

In other words, in the invention, when the feature information is acquired by the registration information acquisition component in the information registration device, a feature of a nonreproducible disorder portion on a document to be verified is compared with a previously registered feature of a nonreproducible disorder portion on the original. On the basis of, for example, the degree of resemblance between them, it is verified whether the document to be verified is the original.

By thus utilizing the feature of the nonreproducible disorder portion, respective documents can be identified individually, and it is easy to verify whether a document is the original. In addition, it is not necessary to conduct special processing on the document unlike the conventional technique. The verification as to whether a document is the original can be implemented at low cost.

In the invention, when the feature information is acquired by the registration information acquisition component in the information registration device, the surface state and/or the thickness-expressing spots state of the document to be verified is compared with the previously registered surface state and/or the thickness-expressing spots state of the original. On the basis of, for example, the degree of resemblance between them, it is verified whether the document to be verified is the original.

The surface state and/or the thickness-expressing spots state is a unique state caused in the fabrication process of a medium, such as paper, used for the document. By utilizing the feature of this state, therefore, respective documents can be identified individually. The verification as to whether a document is the original can be conducted easily. In addition, it is not necessary to conduct special processing on the document unlike the conventional technique. The verification as to whether a document is the original can be implemented at low cost.

Thus, according to the document verification system in the first aspect, an information registration device acquires feature information indicating a feature of a nonreproducible disorder portion in a printing region on a document serving as an original and/or state information indicating a surface state and/or a thickness-expressing spots state in a nonprinting region on the document as registration information, and stores the registration information in the information storage device, and a document verification device acquires information corresponding to the registration information in a document to be verified as to whether the document is an original, as verification information, reads out the registration information from the information storage device, and compares the acquired verification information with the registration information read out and verifies whether the document to be verified is the original on the basis of a result of the comparison. Therefore, it is possible to verify whether a document is the original, at low cost and with ease.

In the invention of the first aspect, preferably at least one set of the information storage device, the information registration device and the document verification device is connected via a network. As a result, it becomes possible to dispose the information storage device, the information registration device and the document verification device in mutually distant places. The convenience of the invention can thus be improved.

The network may include any communication line, such as the Internet, LAN (Local Area Network), WAN (Wide Area Network) or VAN (Value Added Network). The network may use either of wired communication and wireless communication.

In the invention of the first aspect, the information registration device further includes a condition information acquisition component for acquiring condition information, which indicates conditions at the time when the registration information acquired by the registration information acquisition component was obtained from a document serving as the original, and a condition information storage processing component for storing the condition information acquired by the condition information acquisition component in the information storage device, and the document verification device further includes a condition information readout component for reading out the condition information from the information storage device, and a correction component for correcting the verification information acquired by the verification information acquisition component on the basis of the condition information read out by the condition information readout component.

According to the invention, in the information registration device, a condition information acquisition component acquires condition information, which indicates conditions at the time when the registration information acquired by the registration information acquisition component was obtained from a document serving as the original, and a condition information storage processing component stores the condition information acquired by the condition information acquisition component in the information storage device. The condition information may include the sensitivity of the image sensor used when picking registration information with the image sensor, the kind of the image sensor (such as reflection type or transmission type), the angle formed by illumination light used when picking registration information by using illumination light with the document (only when the kind of the image sensor is the reflection type), the wavelength of the illumination light, the reference position of a region where the registration information has been picked on the document, the size of a region where the registration information has been picked, the resolution of the image sensor, and the corrected value concerning the image sensor.

In the invention, in the document verification device, a condition information readout component reads out the condition information from the information storage device, and a correction component corrects the verification information acquired by the verification information acquisition component on the basis of the condition information read out.

In other words, in the invention, the verification information is decided by taking the acquisition condition of the registration information into account. As a result, the precision of the verification as to whether the document to be verified can be improved.

The feature information in the invention may be information indicating a scattering state of an image forming material for the document serving as the original and/or information indicating a state of penetration nonuniformity of the image forming material for the document.

The state information in the invention may be information obtained by receiving reflected light and/or transmitted light for the document serving as the original.

According to the invention, the document verification system may further include a recording device including an identification information recording component for recording identification information capable of identifying a document on the document serving as the original, and a readout device including an identification information readout component for reading out the identification information of a document to be verified. The storage processing component in the information registration device further stores the identification information recorded on the document serving as the original by the identification information recording component in the recording device in the information recording device so as to be associated with the registration information on the document. The readout component in the document verification device reads out registration information associated with identification information corresponding to the identification information read out by the identification information readout component in the readout device, from the information storage device.

According to the invention, an identification information recording component in the recording device records identification information capable of identifying a document on the document serving as the original. Besides recording by printing the identification information itself on the document, the recording of the identification information may include recording of a bar code that indicates the identification information and recording using the electronic watermark technique.

On the other hand, in the invention, an identification information readout component in the readout device reads out the identification information of a document to be verified.

In the invention, the storage processing component in the information registration device further stores the identification information recorded on the document serving as the original by the identification information recording component in the recording device in the information recording device so as to be associated with the registration information on the document. When verifying whether a document is the original, the readout component in the document verification device reads out registration information associated with identification information corresponding to the identification information read out by the identification information readout component in the readout device, from the information storage device.

In other words, in the invention, identification information is recorded on the document serving as the original. In addition, the identification information is previously stored in the information storage device so as to be associated with registration information of the document. When verifying a document to be verified, the identification information recorded on the document is read out, and registration information associated with identification information corresponding to the identification information read out is used for verification of the document. As a result, a plurality of originals can be dealt with.

In the invention of the first aspect, the information storage device further stores position information, which indicates installation positions of the information registration device and the document verification device, and device identification information capable of identifying the devices so as to be associated with each other, and each of the information registration device and the document verification device further includes a device identification information storage component for storing the device identification information, and a device identification information transmission component for transmitting the device identification information stored in the device identification information storage component to outside.

By the information storage device, position information, which indicates installation positions of the information registration device and the document verification device, and device identification information capable of identifying the devices are further stored so as to be associated with each other. As the position information, any information indicating the installation position of the devices, such as information indicating the addresses where the devices are installed or information indicating latitudes and longitudes of the places, may be used.

In the invention, in each of the information registration device and the document verification device, a device identification information storage component, which stores the corresponding device identification information, is provided. The device identification information stored in the device identification information storage component is transmitted to the outside by the device identification information transmission.

By receiving the device identification information transmitted to the outside by the device identification information transmission and reading out position information associated with the device identification information from the information storage device, the location of a device that has transmitted the device identification information can be identified easily.

In order to achieve the object, a second aspect of the invention provides a document verification method for verifying whether a document is an original, the method including the steps of: acquiring, as registration information, at least one of feature information indicating a feature of a nonreproducible disorder portion in a printing region on a document serving as an original and state information indicating at least one of a surface state and a thickness-expressing spots state, in a non-printing region on the document, and stores the registration information in the information storage device; and acquiring, as verification information, information corresponding to the registration information in a document to be verified, as verification information, reads out the registration information from the information storage device, comparing the acquired verification information with the read out registration information and verifies whether the document to be verified is the original on the basis of a result of the comparison.

In the document verification method according to the second aspect, therefore, operation similar to that of the invention of the first aspect is conducted. In the same way as the invention of the first aspect, therefore, it is possible to verify whether a document is the original at low cost and with ease.

In order to achieve the object, a third aspect of the invention provides an information registration device for registering in an information storage device, information used to verify whether a document is an original, and the information registration device includes a registration information acquisition component for acquiring, as registration information, at least one of feature information indicating a feature of a nonreproducible disorder portion in a printing region on a document serving as an original and state information indicating at least one of a surface state and a thickness-expressing spots state in a non-printing region on the document, and a storage processing component for storing the registration information in the information storage device.

According to the information registration device of the third aspect, a registration information acquisition component acquires feature information indicating a feature of a nonreproducible disorder portion in a printing region on a document serving as an original and/or state information indicating a surface state and/or a thickness-expressing spots state in a non-printing region on the document as registration information. And a storage processing component stores the registration information in the information storage device.

Herein, the nonreproducible disorder portion is a microscopic image disorder that is contained in an image recorded on a recording medium such as paper and that could not be controlled when recording the image, such as the scattering state of an image forming material on a document generated when recording the image on the document, the state of nonuniform penetration, incomplete shape reproduction, and microscopic nonuniformity of the image forming material at the time of low coverage ratio. The document may be a printed matter having an image recorded thereon by printing or a hand written document. The document may be a paper medium or a resin medium.

In other words, in the invention, when the feature information is acquired by the registration information acquisition component in the information registration device, a feature of a nonreproducible disorder portion on a document to be verified is compared with a previously registered feature of a nonreproducible disorder portion on the original. On the basis of, for example, the degree of resemblance between them, it is verified whether the document to be verified is the original.

By thus utilizing the feature of the nonreproducible disorder portion, respective documents can be identified individually, and it is easy to verify whether a document is the original. In addition, it is not necessary to conduct special processing on the document unlike the conventional technique. The verification as to whether a document is the original can be implemented at low cost.

In the invention, when the feature information is acquired by the registration information acquisition component, the surface state and/or the thickness-expressing spots state of the document to be verified is compared with the previously registered surface state and/or the thickness-expressing spots state of the original. On the basis of, for example, the degree of resemblance between them, it is verified whether the document to be verified is the original.

The surface state and/or the thickness-expressing spots state is a unique state caused in the fabrication process of a medium, such as paper, used for the document. By utilizing the feature of this state, therefore, respective documents can be identified individually. The verification as to whether a document is the original can be conducted easily. In addition, it is not necessary to conduct special processing on the document unlike the conventional technique. The verification as to whether a document is the original can be implemented at low cost.

Thus, according to the information registration device in the third aspect, feature information indicating a feature of a nonreproducible disorder portion in a printing region on a document serving as an original and/or state information indicating a surface state and/or a thickness-expressing spots state in a non-printing region on the document is acquired as registration information, and the registration information is stored in the information storage device. By utilizing the registration information stored in the information storage device, therefore, it is possible to verify whether a document is the original, at low cost and with ease.

In order to achieve the object, a fourth aspect of the invention provides a recording medium comprising an information registration instruction recorded thereon, the information registration instruction causing a computer to execute processing of registering, in an information storage, information used to verify whether a document is an original, the information registration instruction including the steps of: acquiring, as registration information, at least one of feature information indicating a feature of a nonreproducible disorder portion in a printing region on a document serving as an original and state information indicating at least one of a surface state and a thickness-expressing spots state in a non-printing region on the document; and storing the registration information in the information storage device.

According to the recording medium of the fourth aspect having the information registration instruction recorded thereon, therefore, operation similar to that of the invention of the third aspect can be conducted on the computer. By utilizing the registration information stored in the information storage device in the same way as the invention of the third aspect, therefore, it is possible to verify whether a document is the original at low cost and with ease.

In order to achieve the object, a fifth aspect of the invention provides a document verification device for verifying whether or not a document is the original by reading out registration information from an information storage device, in which at least one of feature information indicating a feature of a nonreproducible disorder portion in a printing region of a document serving as an original and state information indication at least one of a surface state and a thickness-expressing spots state in a nonprinting region in the document has been registered as the registration information, the document verifying device comprising: an verification information acquisition component for acquiring, as verification information, information corresponding to the registration information in a document to be verified; a readout component for reading out the registration information from the information storage device; and an verification component for comparing the verification information acquired by the verification information acquisition component with the registration information read out by the readout component, and verifying whether the document to be verified is the original on the basis of a result of the comparison.

According to the document verification device in the fifth aspect, feature information indicating a feature of a nonreproducible disorder portion in a printing region on a document serving as an original and/or state information indicating a surface state and/or a thickness-expressing spots state in a non-printing region on the document is acquired as registration information, and the registration information is previously stored in the information storage device as registration information. By reading out the registration information from the document verification device, it is verified whether a document is the original.

The nonreproducible disorder portion is a microscopic image disorder that is contained in an image recorded on a recording medium such as paper and that could not be controlled when recording the image, such as the scattering state of an image forming material on a document generated when recording the image on the document, the state of nonuniform penetration, incomplete shape reproduction, and microscopic nonuniformity of the image forming material at the time of low coverage ratio. The document may be a printed matter having an image recorded thereon by printing or a hand written document. The document may be a paper medium or a resin medium.

In the invention, information corresponding to the registration information on a document to be verified as to whether the document is an original is acquired as verification information by an verification information acquisition component. In addition, the registration information is read out from the information storage device by a readout component. And an verification component compares the verification information acquired by the verification information acquisition component with the registration information read out by the readout component and verifies whether the document to be verified is the original on the basis of a result of the comparison.

In other words, in the invention, when the feature information is used to verify a document, a feature of a nonreproducible disorder portion on a document to be verified is compared with a previously registered feature of a nonreproducible disorder portion on the original. On the basis of, for example, the degree of resemblance between them, it is verified whether the document to be verified is the original.

By thus utilizing the feature of the nonreproducible disorder portion, respective documents can be identified individually, and it is easy to verify whether a document is the original. In addition, it is not necessary to conduct special processing on the document unlike the conventional technique. The verification as to whether a document is the original can be implemented at low cost.

In the invention, when the feature information is used to verify a document, the surface state and/or the thickness-expressing spots state of the document to be verified is compared with the previously registered surface state and/or the thickness-expressing spots state of the original. On the basis of, for example, the degree of resemblance between them, it can be verified whether the document to be verified is the original.

The surface state and/or the thickness-expressing spots state is a unique state caused in the fabrication process of a medium, such as paper, used for the document. By utilizing the feature of this state, therefore, respective documents can be identified individually. The verification as to whether a document is the original can be conducted easily. In addition, it is not necessary to conduct special processing on the document unlike the conventional technique. The verification as to whether a document is the original can be implemented at low cost.

According to the document verification device in the fifth aspect, feature information indicating a feature of a nonreproducible disorder portion in a printing region on a document serving as an original and/or state information indicating a surface state and/or a thickness-expressing spots state in a non-printing region on the document is previously registered in the information storage device as registration information. When reading out the registration information from the information storage device and verifying whether a document is the original, the document verification device acquires information corresponding to the registration information in a document to be verified as to whether the document is an original, as verification information, reads out the registration information from the information storage device, and compares the acquired verification information with the registration information readout, and verifies whether the document to be verified is the original on the basis of a result of the comparison. By utilizing the registration information stored in the information storage device in the same way as the invention of the third aspect, therefore, it is possible to verify whether a document is the original at low cost and with ease.

In order to achieve the object, a sixth aspect of the invention provides a medium comprising a document verification instruction recorded thereon, the document verification instruction causing a computer to execute processing for verification whether or not a document is the original by reading out registration information from an information storage device, in which at least one of feature information indicating a feature of a nonreproducible disorder portion in a printing region of a document serving as an original and state information indication at least one of a surface state and a thickness-expressing spots state in a nonprinting region in the document has been registered as the registration information, the document verification instruction including the steps of: acquiring, as verification information, information corresponding to the registration information in a document to be verified; reading out the registration information from the information storage device; comparing the verification information acquired at the verification information acquisition step with the registration information read out at the readout step, and verifying whether the document to be verified is the original on the basis of a result of the comparison.

According to the recording medium of the sixth aspect having the document verification instruction recorded thereon, therefore, operation similar to that of the invention of the fifth aspect can be conducted on the computer. By utilizing the registration information stored in the information storage device in the same way as the invention of the fifth aspect, therefore, it is possible to verify whether a document is the original at low cost and with ease.

In order to achieve the object, a seventh aspect of the invention provides a document verification database used to verify whether a document is an original, wherein at least one of feature information indicating a feature of a nonreproducible disorder portion in a printing region on a document serving as an original and state information indicating at least one of a surface state and a thickness-expressing spots state in a non-printing region on the document is registered in the document verification database as registration information.

The nonreproducible disorder portion is a microscopic image disorder that is contained in an image recorded on a recording medium such as paper and that could not be controlled when recording the image, such as the scattering state of an image forming material on a document generated when recording the image on the document, the state of nonuniform penetration, incomplete shape reproduction, and microscopic nonuniformity of the image forming material at the time of low coverage ratio. The document may be a printed matter having an image recorded thereon by printing or a hand written document. The document may be a paper medium or a resin medium.

In other words, in the invention, when the feature information in the document verification database of the invention is used to verify a document, a feature of a nonreproducible disorder portion on a document to be verified is compared with a previously registered feature of a nonreproducible disorder portion on the original. On the basis of, for example, the degree of resemblance between them, it is verified whether the document to be verified is the original.

By thus utilizing the feature of the nonreproducible disorder portion, respective documents can be identified individually, and it is easy to verify whether a document is the original. In addition, it is not necessary to conduct special processing on the document unlike the conventional technique. The verification as to whether a document is the original can be implemented at low cost.

When the feature information in the document verification database of the invention is used to verify a document, the surface state and/or the thickness-expressing spots state of the document to be verified is compared with the state information registered in the document verification database. On the basis of, for example, the degree of resemblance between them, it can be verified whether the document to be verified is the original.

The surface state and/or the thickness-expressing spots state is a unique state caused in the fabrication process of a medium, such as paper, used for the document. By utilizing the feature of this state, therefore, respective documents can be identified individually. The verification as to whether a document is the original can be conducted easily. In addition, it is not necessary to conduct special processing on the document unlike the conventional technique. The verification as to whether a document is the original can be implemented at low cost.

Thus, according to the document verification database of the seventh aspect, feature information indicating a feature of a nonreproducible disorder portion in a printing region on a document serving as an original and/or state information indicating a surface state and/or a thickness-expressing spots state in a non-printing region on the document is previously registered. By utilizing the registration information, therefore, it is possible to verify whether a document is the original, at low cost and with ease.

As heretofore described in detail, according to the document verification system and the document verification method of the invention, an information registration device acquires feature information indicating a feature of a nonreproducible disorder portion in a printing region on a document serving as an original and/or state information indicating a surface state and/or a thickness-expressing spots state in a non-printing region on the document as registration information, and stores the registration information in the information storage device, and a document verification device acquires information corresponding to the registration information in a document to be verified as to whether the document is an original, as verification information, reads out the registration information from the information storage device, and compares the acquired verification information with the registration information read out and verifies whether the document to be verified is the original on the basis of a result of the comparison. This brings about an effect that it is possible to verify whether a document is the original, at low cost and with ease.

In the information registration device and the recording medium having the information registration instruction recorded thereon according to the invention, feature information indicating a feature of a nonreproducible disorder portion in a printing region on a document serving as an original and/or state information indicating a surface state and/or a thickness-expressing spots state in a non-printing region on the document is acquired as registration information, and the registration information is stored in the information storage device. This brings about an effect that it is possible to verify whether a document is the original, at low cost and with ease by utilizing the registration information stored in the information storage device.

In document verification device and the medium having the document verification instruction recorded thereon according to the invention, feature information indicating a feature of a nonreproducible disorder portion in a printing region on a document serving as an original and/or state information indicating a surface state and/or a thickness-expressing spots state in a non-printing region on the document is previously registered in the information storage device as registration information. When reading out the registration information from the information storage device and verifying whether a document is the original, the document verification device acquires information corresponding to the registration information on a document to be verified as to whether the document is an original, as verification information, reads out the registration information from the information storage device, and compares the acquired verification information with the registration information read out, and verifies whether the document to be verified is the original on the basis of a result of the comparison. This brings about an effect that it is possible to verify whether a document is the original, at low cost and with ease by utilizing the registration information stored in the information storage device.

In the document verification database according to the invention, feature information indicating a feature of a nonreproducible disorder portion in a printing region on a document serving as an original and/or state information indicating a surface state and/or a thickness-expressing spots state in a non-printing region on the document is previously registered. This brings about an effect that it is possible to verify whether a document is the original, at low cost and with ease by utilizing the registration information stored in the information storage device.

BRIEF DESCRIPTION OF THE DRAWINGS

FIG. 8 is a schematic diagram showing a configuration example of a document management database.

FIG. 9 is a schematic diagram showing a configuration example of a sensor management database.

FIG. 10 is a block diagram showing a configuration of an electric system of a terminal device.

FIG. 14 is a flow chart showing a processing flow of a ticket purchase processing program according to a first embodiment of the present invention.

FIGS. 15A to 15D are schematic diagrams showing an example of transition of a ticket purchase screen.

DESCRIPTION OF THE PREFERRED EMBODIMENTS

Figure 1A:
FIGS. 1A to 1C are partial enlarged views of results obtained by copying the same gray image with an electrophotographic copying machine.

In an embodiment of the present invention, a case where feature information indicating a feature of a nonreproducible disorder portion in a printing region of a document is applied as registration information and verification information will be described. First, prior to description of embodiments according to the invention, a nonreproducible disorder portion (hereafter referred to as random pattern) that is included in an image recorded on a document will now be described. Hereafter, a nonreproducible random pattern of an image forming material that occurs in a printed matter having an image printed by a printing machine will be mainly described.

For example, in the case of a toner image, the nonreproducible random pattern is known as unevenness (jag) of a line edge portion in a tangential line direction (in the case of characters, TEP-tangential edge profile), micro density nonuniformity, omission (void) in an image portion, scattering of toner near the image portion (blur, image dependent noise), scattering of toner in a background portion (image independent noise) and so on. By the way, the image forming material means a substance for giving coloring in a thin film form on an object. For example, the image forming materials include, for example, printing ink, paints, coloring grains (toner) for electrophotography or ionography, liquid toner, ink of ink jet printers, ink (ribbons) for thermal transfer printers, and ink for sublimation printers. The image forming material is not a material having a color under visible light, but may be a material that forms a colored visible image in response to radiation of, for example, ultraviolet rays or infrared rays. On the contrary, the image forming material may be a material that can form a visible image by using an ultraviolet ray or infrared ray sensor.

The reason why a nonreproducible random pattern is generated and an advantage of utilizing its feature will now be described.

As for the image forming material of a printed matter, it is ideal to provide such a suitable quantity as to provide a predetermined density in a specific position on a medium on the basis of data or original image information. In fact, however, it is difficult to strictly control the position and quantity when printing is conducted by using a printing machine. Uncertainty in the attaching position and quantity of the image forming material is permitted in such a range as not to constitute a hindrance to the cost and the purpose of the printed matter. In typical printed matters, the permissible range depends on the spatial frequency characteristics of vision. Microscopically, existence of nonreproducible random patterns caused by nonexecution of control is permitted. Or there is the case where even if macroscopically the density is uniform, uneven distribution of an image forming material is permitted microscopically, like gray reproduction.

For example, in the process of development, transfer, and fusing in the electrophotography technique, uncontrollable scattering of toner and defective reproduction caused by electric field disorder, repulsion between toner grains having the same polarity, and mechanical jump are observed, but they do not constitute a hindrance to ordinary use. In the ink jet technique, so-called spread caused by penetration nonuniformity of ink is observed depending upon the quality of the printing medium. Hereafter, an example of such a nonreproducible random pattern will be described in detail.

Figure 1B:
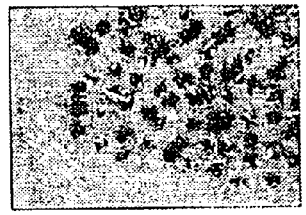
Figure 1C:
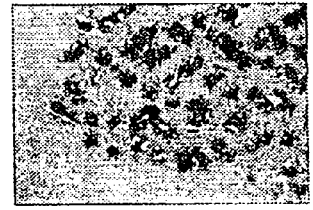

FIGS. 1A to 1C are partial enlarged views of copy results of three sheets obtained by copying (printing) the same gray image with an electrophotographic copying machine. In digital electrophotography technique, half tone reproduction is conducted by conducting binarization using the dither method and the density pattern method. Even when the same gray image is printed, the form of pixels forming mesh points and distribution of individual toner grains forming each pixel cannot be controlled, and microscopically the copy results become obviously different images, as will be appreciated from FIGS. 1A to 1C. Even when obtaining a plurality of copies using the analog electrophotography technique, or even when the original image is the same, i.e., the latent image potential has the same half tone, positions of individual toner grains having a development quantity that cancels the potential cannot be controlled. In other words, even if the toner cover ratio on paper observed as the optical density is the same, the possibility that microscopic toner attachment nonuniformity becomes the same is extremely low.

Figure 2A:
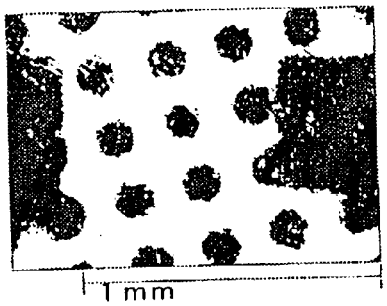
FIG. 2A is a partial enlarged view of an offset-printed original image.
Figure 2B:
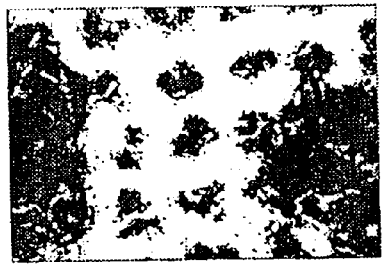
FIGS. 2B to 2D are partial enlarged views of results obtained by copying the original image shown in FIG. 2A with an electrophotographic copying machine.
Figure 2C:
Figure 2D:
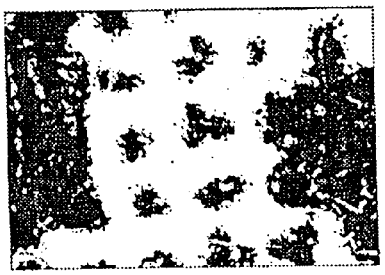

FIGS. 2A to 2D show examples obtained by copying a mesh point portion of an offset printed image with an electrophotographic copying machine. FIG. 2A is a partial enlarged view of an original image (offset-printed image), and FIGS. 2B to 2D show enlarged views of copy results of the same portion as that shown in FIG. 2A obtained by copying the original image shown in FIG. 2A. Although the same original image has been copied, the copy results become images that are microscopically different in dot shapes and toner scattering as will be appreciated from FIGS. 2A to 2D.

Figure 3A:
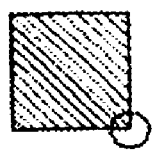
FIG. 3A shows a printed image pattern.
Figure 3B:
FIGS. 3B and 3C are partial enlarged views of results obtained by printing the image pattern shown in FIG. 3A with an electrophotographic printer.
Figure 3C:

FIGS. 3A to 3C show examples obtained by conducting printing with an electrophotographic printer (such as a laser printer). FIG. 3A shows a printed image pattern, and FIGS. 3B and 3C are enlarged views of a portion surrounded by a circle in the pattern of FIG. 3A in printing results of two sheets. Although they are printed results obtained by conducting copying on the basis of the same data, the copy results become images that are microscopically different in shapes of respective rectangles forming the pattern and toner scattering as will be appreciated from FIGS. 3A to 3C.

Figure 4A:
FIGS. 4A to 4C are partial enlarged views of results obtained by printing the image pattern shown in FIG. 3A with an ink jet printer.
Figure 4B:
Figure 4C:
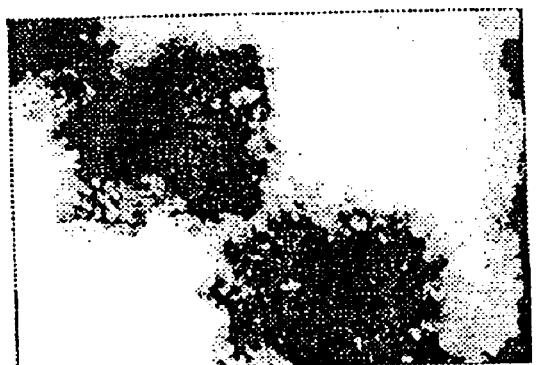

FIGS. 4A to 4C show examples obtained by outputting the same pattern as that of FIG. 3A with an ink jet printer. Although three images shown in FIGS. 4A to 4C are the same image, the penetration of ink to paper differs and they become microscopically different images. Such deviation of ink from the original pattern occurs in offset printing and relief printing as well. For example, in mesh point printing using a letterpress, ink is forced out from the mesh point diameter of the original pattern and becomes thick (dot gain), and its shape becomes indefinite.

As heretofore described, microscopically it is impossible in any printing machine to completely control the attachment positions of the image forming material. If the random pattern information is utilized, then it becomes possible to separate and discriminate a plurality of prints or copies output from the same image data. Furthermore, for reproducing a microscopic random pattern of image forming material attachment positions, position control of the toner grain diameter (several to 10 $\mu$m) order is required in the case of toner. In the case of liquid ink, size and position control of ink drop size (several picoliters) order and position control of a porous structure (several to 10 $\mu$m) order on the medium side are demanded. In other words, it is almost impossible to intentionally obtain printed matters that are completely the same microscopically.

As heretofore described, since the random pattern is disorder of the image formed without successfully conducting complete control in the printing machine, the random pattern cannot be reproduced. In the present invention, this fact is utilized on the contrary. It is verified that a printed matter is the original by using the nonreproducible random pattern as information (discrimination collation information) for determining whether the printed matter is the original.

Hereafter, embodiments of the invention will be described in detail with reference to the drawings.

FIRST EMBODIMENT

In the first embodiment, the case where the invention is applied to a document verification system in which a document serving as the original is printed by a printer installed in each customer's house and a document to be verified as to whether it is the original is verified outside the house will now be described. First, a configuration of a document verification system 10A according to the present embodiment will now be described with reference to FIG. 5.

Figure 5:
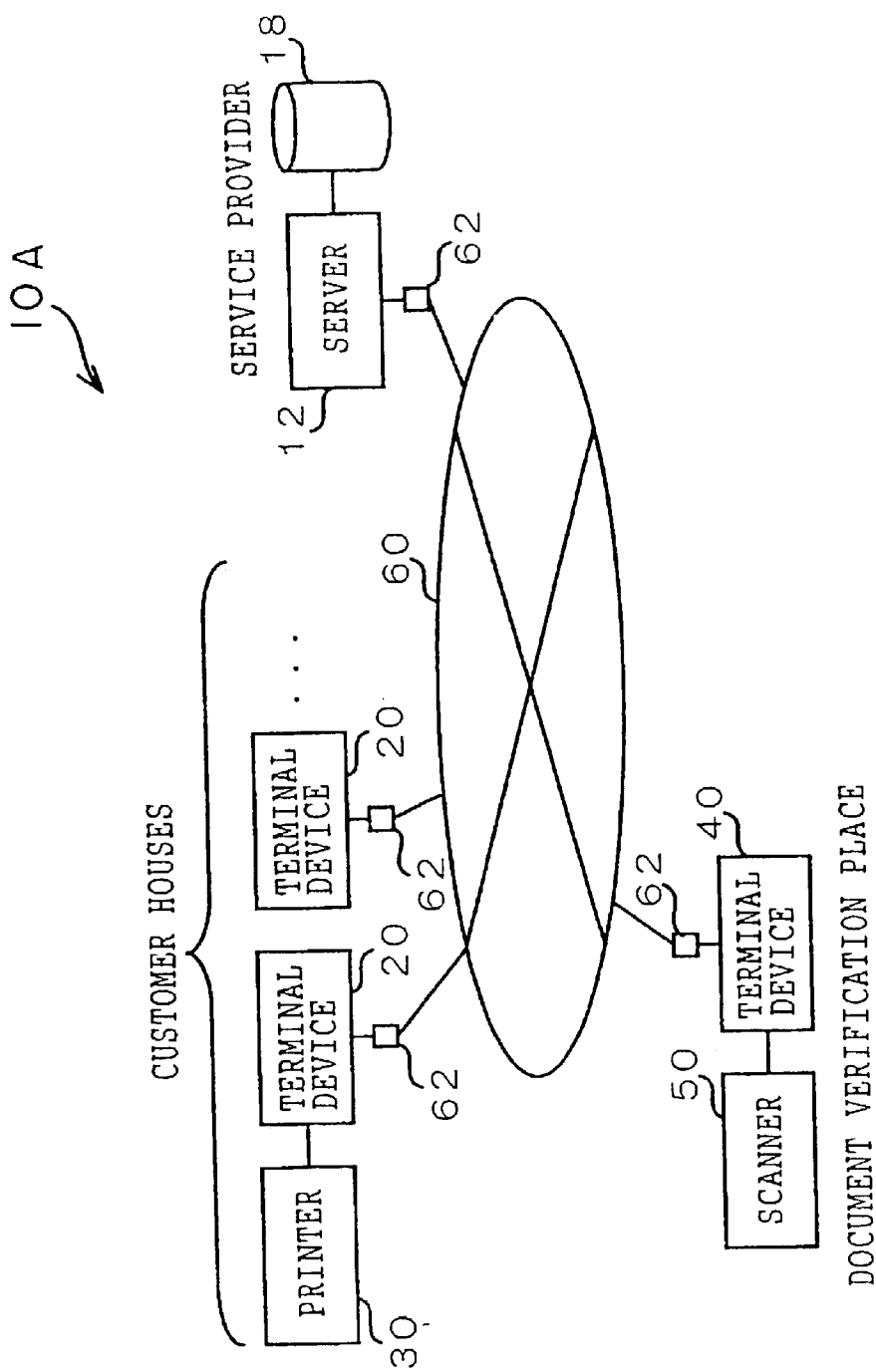
FIG. 5 is a block diagram showing a configuration of a document verification system according to a first embodiment of the present invention.

As shown in FIG. 5, the document verification system 10A according to the present embodiment is configured by connecting a server 12 owned by a service provider who provides document verification service using the document verification system 10A, terminal devices 20 owned respectively by customers who are under contract with the service provider in order to utilize the document verification service, and a terminal device 40 installed by the service provider in a place where verification is conducted as to whether a document is the original to the Internet 60 through connection devices 62, such as modems, routers and a TA (Terminal Adapter), respectively.

Each of the server 12, the terminal devices 20 and the terminal device 40 has input devices, such as a keyboard and a mouse, for inputting various kinds of information. Since the hardware configuration is typical, detailed description will be omitted.

The server 12 according to the present embodiment functions as a WWW (World Wide Web) server, and the terminal devices 20 and the terminal device 40 function as WWW clients. In other words, a WWW browser is installed in each of the terminal devices 20 and the terminal device 40. By starting the WWW browser, it is possible to arbitrarily access the server 12 via the Internet 60. At this time, the access position is specified by a URL (Uniform Resource Locator). For identifying the terminal devices 20 and the terminal device 40, IP (Internet Protocol) addresses are used. However, other position specification codes such as URLs may also be used.

On the other hand, a hard disk 18 for storing various databases and various programs concerning the document verification service is connected to the server 12. Furthermore, a printer 30 for printing a document is connected to each of the terminal devices 20, and a scanner 50 used to verify whether a document is the original is connected to the terminal device 40. In order to facilitate description, FIG. 5 shows the state in which the printer 30 is connected to only one terminal device 20. As a matter of fact, however, a printer 30 is connected to every terminal device 20.

Figure 11:
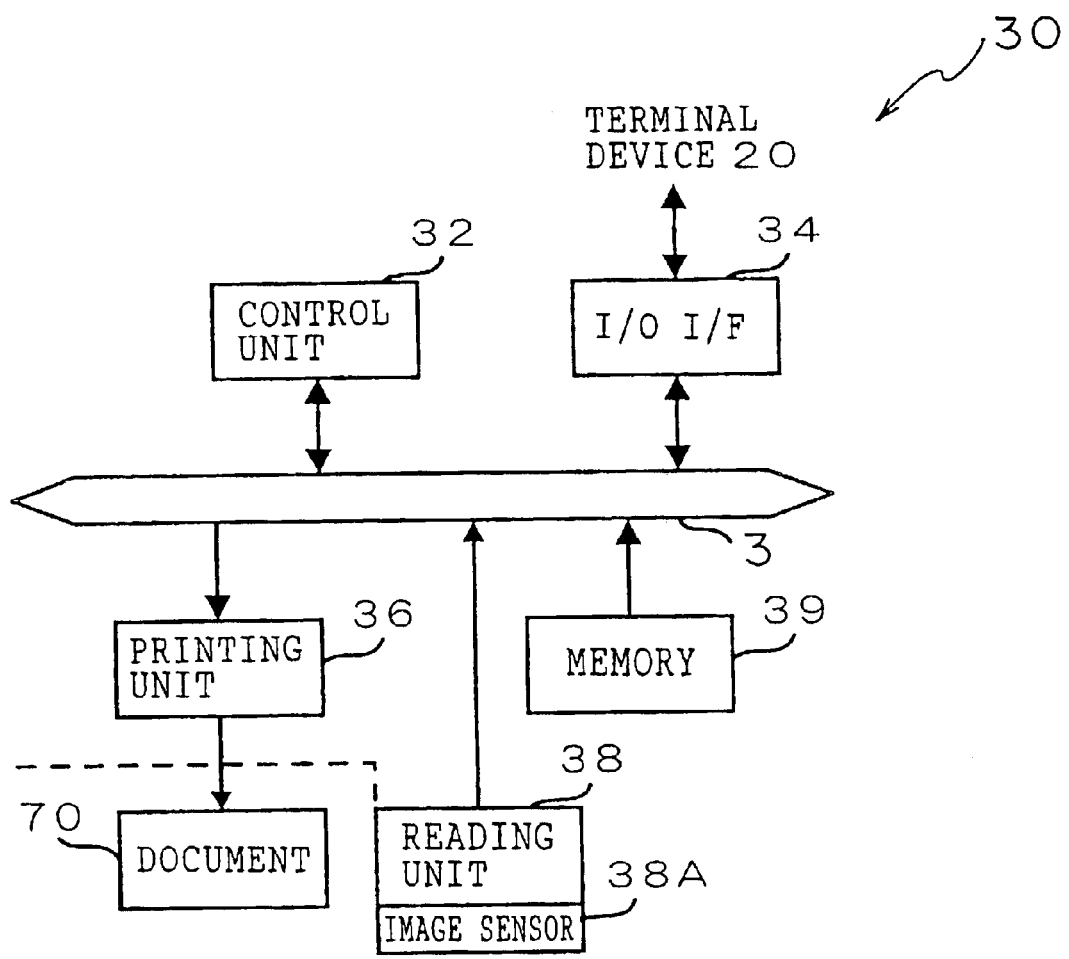
FIG. 11 is a block diagram showing a configuration of an electric system of a printer.
Figure 13:
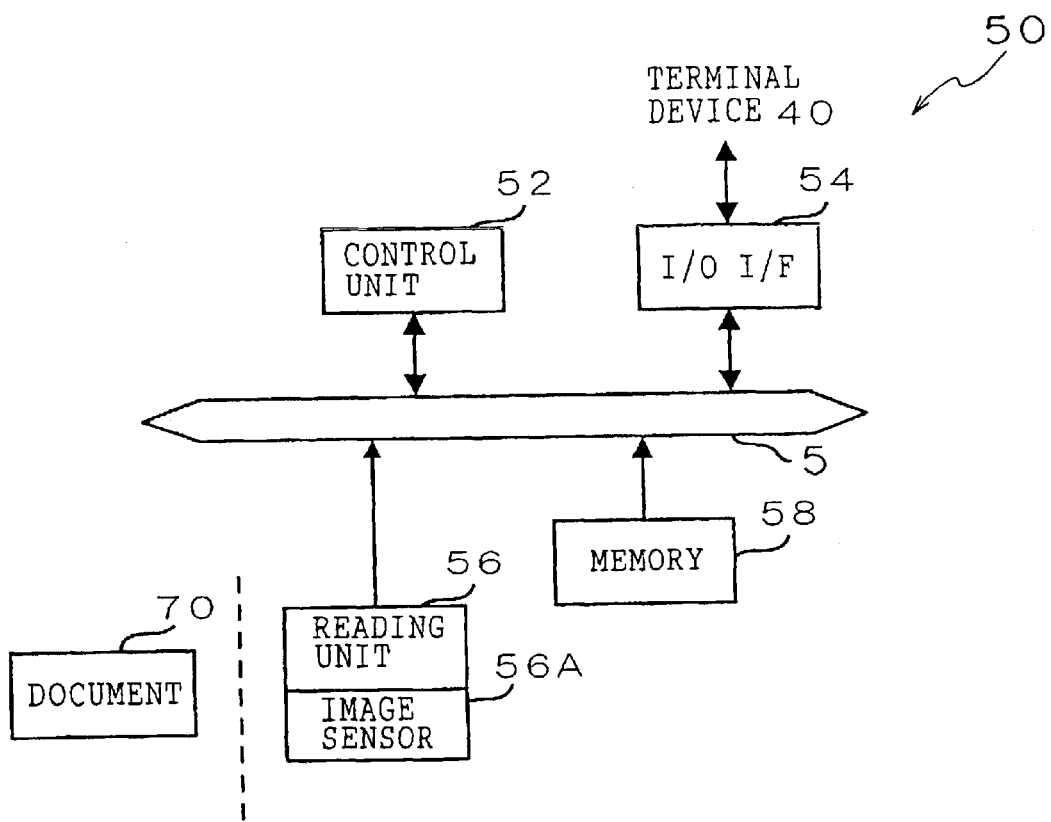
FIG. 13 is a block diagram showing a configuration of an electric system of a scanner.

The printers 30 and the scanner 50 have configurations that are substantially the same as commercially available ones. As shown in FIGS. 11 and 13, the printer 30 includes an image sensor 38A for reading a rectangular region of a predetermined size including a predetermined position of a document (an upper left corner part of the document in the present embodiment) printed by the printer 30, and a nonvolatile memory 39 for previously storing readout unit ID information SID, which can identify the image sensor 38A. The scanner 50 includes an image sensor 56A for reading a rectangular region of a predetermined size including the predetermined position of a document (an upper left corner part of the document in the present embodiment) to be verified as to whether it is the original, and a nonvolatile memory 58 for previously storing readout unit ID information SID, which can identify the image sensor 56A. Each of the rectangular region read by the image sensor 38A of the printer 30 and the rectangular region read by the image sensor 56A of the scanner 50 includes both the printing region and the non-printing region.

Figure 6:
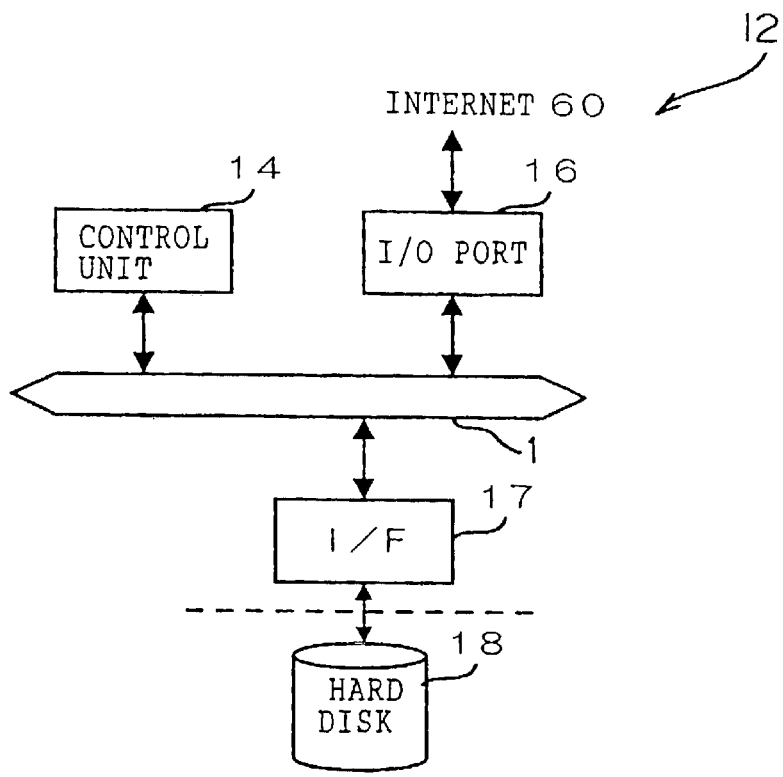
FIG. 6 is a block diagram showing a configuration of an electric system of a server.

On the other hand, FIG. 6 shows a configuration of an electric system in a portion of the server 12 especially relating to the invention. As shown in FIG. 6, the server 12 includes a control unit 14 for managing operation of the whole server 12, an input/output port 16 for receiving/sending various kinds of information from/to an external device connected to the Internet 60, and an input/output interface unit 17 for controlling access to a hard disk 18 connected thereto. The control unit 14, the input/output port 16 and the input/output interface unit 17 are connected to each other via a bus 1. Therefore, the control unit 14 can receive/send various kinds of information from/to an external device connected to the Internet 60 via the bus 1 and the input/output port 16, and can write/read various kinds of information into/from the hard disk 18 via the bus 1 and the input/output interface unit 17.

Figure 7:
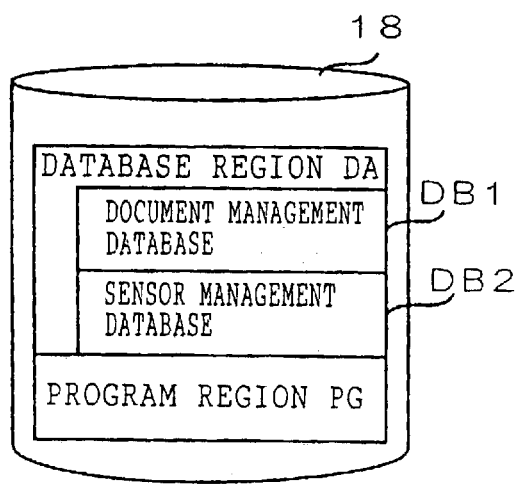
FIG. 7 is a schematic diagram showing various storage contents of a hard disk.

FIG. 7 schematically shows various storage contents of the hard disk 18. As shown in FIG. 7, a database region DA for storing various databases and a program region PG for storing various programs are provided on the hard disk 18.

In the database region DA, a document management database DB1 for storing various kinds of information concerning a document to be dealt with in the document verification service, and a sensor management database DB2 for storing various kinds of information concerning the image sensor 38A in the printer 30 (see FIG. 11) and the image sensor 56A in the scanner 50 (see FIG. 13) are disposed. Hereafter, configurations of respective databases will be described.

As shown in FIG. 8, the document management database DB1 according to the present embodiment stores, for each document serving as the original, document ID information DID (corresponding to "identification information" in the invention), which is ID (Identification) information individually assigned to each document serving as the original in order to identify the document serving as the original, feature information picked from the document serving as the original and used when verifying whether a document to be verified is the original, condition information indicating conditions in picking the feature information concerning an image sensor used when picking the feature information (the image sensor 38A incorporated in the printer 30 in the present embodiment), and readout unit ID information SID for identifying the image sensor.

The condition information includes the following conditions:
1. A sensitivity of the image sensor used when picking feature information;
2. A kind of the image sensor used when picking feature information (such as reflection type or transmission type);
3. An angle formed by illumination light used when picking feature information with the document (only when the kind of the image sensor is the reflection type);
4. A wavelength (nm) of the illumination light;
5. A reference position of a region where the feature information has been picked on the document (in the present embodiment, which is a position measured from an upper left corner of the document, and which is represented by a distance (mm) from the left end of the document and a distance (mm) from the top end of the document);
6. A size of an image region where the feature information has been picked (the number of pixels in the horizontal direction by the number of pixels in the vertical direction);
7. A resolution (dpi) of the image sensor; and
8. A corrected value of the image sensor (various correction coefficients).

On the other hand, as shown in FIG. 9, the sensor management database DB2 according to the present embodiment stores, for each readout unit ID information SID, readout unit ID information SID assigned to each of the image sensors 38A incorporated in the printers 30 and the image sensor 56A incorporated in the scanner 50, installation place information indicating a place where a device (the printer 30 or the scanner 50) incorporating an image sensor identified by the readout unit ID information SID is installed, and the condition information concerning the image sensor.

The service provider grasps the readout unit ID information SID of the image sensor 38A incorporated in the printer 30, the condition information concerning the image sensor 38A, the place where the printer 30 is installed, the readout unit ID information SID of the image sensor 56A incorporated in the scanner 50, the condition information concerning the image sensor 56A, and the place where the scanner 50 is installed. The sensor management database DB2 is constructed (updated) by the service provider via the server 12.

It is possible to grasp the installation places of the printer 30 and the scanner 50 to be dealt with by the document verification system by referring to the sensor management database DB2.

On the other hand, FIG. 10 shows a configuration of an electric system in a portion of the terminal device 20 especially relating to the invention. As shown in FIG. 10, the terminal device 20 includes a control unit 22 for managing operation of the whole terminal device 20, an input/output port 23 for receiving/sending various kinds of information from/to an external device connected to the Internet 60, and an interface unit 24 for connecting a display 25, and an interface unit 26 for connecting the printer 30. The control unit 22, the input/output port 23 and the interface unit 24 and the interface unit 26 are connected to each other via a bus 2.

Therefore, the control unit 22 can receive/send various kinds of information from/to an external device connected to the Internet 60 via the bus 2 and the input/output port 23, display various kinds of information on the display 25 via the bus 2 and the interface unit 24, and can receive/send various kinds of information from/to the printer 30 via the bus 2 and the interface unit 26.

FIG. 11 shows a configuration of an electric system in a portion of the printer 30 especially relating to the invention. As shown in FIG. 11, the printer 30 includes a control unit 32 for managing operation of the whole printer 30, an input/output interface unit 34 for connection to the terminal device 20, a printing unit 36 for printing various documents, a reading unit 38 incorporating the image sensor 38A, the memory 39. The control unit 32, the input/output interface unit 34, the printing unit 36, the reading unit 38 and the memory 39 are connected to each other via a bus 3.

Therefore, the control unit 32 can receive/send various kinds of information from/to the terminal device 20 via the bus 3 and the input/output interface unit 34, print a document 70 by using the printing unit 36 via the bus 3, receive a result of image reading conducted by the reading unit 38 (the image sensor 38A), and access the memory 39.

Figure 12:
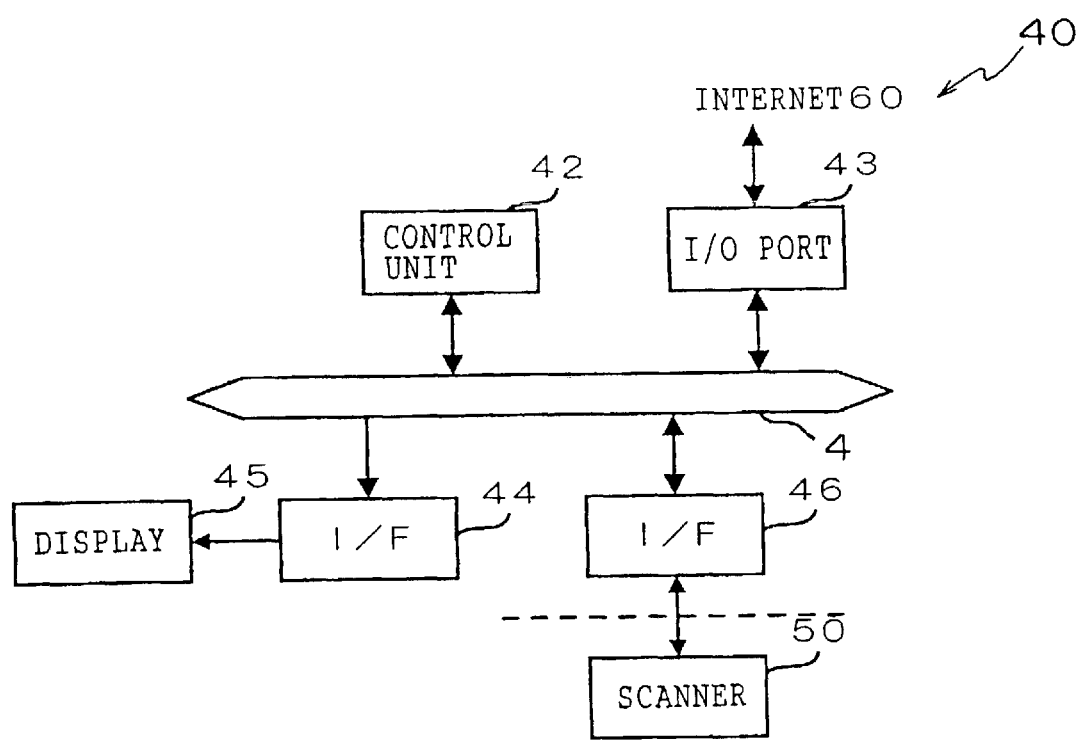
FIG. 12 is a block diagram showing a configuration of an electric system of a terminal device.

FIG. 12 shows a configuration of an electric system in a portion of the terminal device 40 especially relating to the invention. As shown in FIG. 12, the terminal device 40 includes a control unit 42 for managing operation of the whole terminal device 40, an input/output port 43 for receiving/sending various kinds of information from/to an external device connected to the Internet 60, and an interface unit 44 for connecting a display 45, and an interface unit 46 for connecting the scanner 50. The control unit 42, the input/output port 43 and the interface unit 44 and the interface unit 46 are connected to each other via a bus 4.

Therefore, the control unit 42 can receive/send various kinds of information from/to an external device connected to the Internet 60 via the bus 4 and the input/output port 43, display various kinds of information on the display 45 via the bus 4 and the interface unit 44, and can receive/send various kinds of information from/to the scanner 50 via the bus 4 and the interface unit 46.

FIG. 13 shows a configuration of an electric system in a portion of the scanner 50 especially relating to the invention. As shown in FIG. 13, the scanner 50 includes a control unit 52 for managing operation of the whole scanner 50, an input/output interface unit 54 for connection to the terminal device 40, a reading unit 56 incorporating the image sensor 56A, and the memory 58. The control unit 52, the input/output interface unit 54, the reading unit 56 and the memory 58 are connected to each other via a bus 5.

Therefore, the control unit 52 can receive/send various kinds of information from/to the terminal device 40 via the bus 5 and the input/output interface unit 54, receive a result of image reading conducted by the reading unit 56 (the image sensor 56A) via the bus 5, and access the memory 58.

In the present embodiment, the hard disk 18 corresponds to an information storage device of the invention, and the terminal device 20 corresponds to an information registration device of the invention. The server 12 corresponds to a document verification device of the invention, and the printer 30 corresponds to a recording device of the invention. The printing unit 36 corresponds to an identification information recording component of the invention, and the scanner 50 corresponds to a readout device of the invention. The reading unit 56 corresponds to an identification information readout component of the invention, and the Internet 60 corresponds to a network of the invention.

Operation of the document verification system 10A according to the present embodiment will now be described. The case where the invention is applied to document verification service in which a concert ticket is used as the document of the invention and printed by the printer 30 installed in each customer's house and it is verified at an entrance of a concert hall whether the ticket is the original will now be described. In this case, the terminal device 40 and the scanner 50 are installed at the entrance of the concert hall.

First, ticket purchase processing executed in the terminal device 20 installed in each customer's house will now be described with reference to FIG. 14. FIG. 14 is a flow chart showing a processing flow of a ticket purchase processing program, which is executed by the control unit 22 of the terminal device 20 when the server 12 is accessed by some customer via the WWW browser of the terminal device 20 and an execution order of ticket purchase service provided by a service provider is given.

At step 100 shown in FIG. 14, a predetermined ticket purchase screen is displayed on the display 25. At subsequent step 102, predetermined information inputting is waited for.

FIG. 15A shows the ticket purchase screen displayed on the display 25 by the processing conducted at the step 100. In the ticket purchase screen according to the present embodiment, a rectangular frame for inputting a name of a desired concert, a seat kind (such as seat S and seat A), and a credit card number, which indicates a deduction destination of a ticket purchase expense is displayed as shown in FIG. 15A.

When the ticket purchase screen as shown in FIG. 15A is displayed on the display 25, the customer inputs a name of a desired concert, a seat kind and a credit card number in corresponding rectangular frames by using the keyboard and the mouse, and then points and specifies an "end" button displayed at the bottom of the picture with the mouse. As a result, information of the input concert name, seat kind and credit card number is input to the control unit 22. The step 102 yields an affirmative decision, and the processing proceeds to step 104.

At the step 104, the information of the input concert name, seat kind and credit card number is transmitted to the server 12. In response to this, the server 12 conducts processing for concert reservation according to the received information of the concert name and the seat kind. Thereafter, the server 12 generates document ID information DID that is not registered in the document management database DB1 at that time, and transmits the information concerning the reserved seat and concert and the generated document ID information DID to the terminal device 20 of the access source.

At subsequent step 106, reception of the information from the server 12 is waited for. At subsequent step 108, the ticket purchase screen displayed on the display 25 is updated on the basis of received information. At subsequent step 110, inputting of predetermined information is waited for.

FIG. 15B shows the ticket purchase screen updated by the processing at the step 108. As shown in FIG. 15B, the information concerning the reserved seat and concert is displayed on the ticket purchase screen together with a "issue ticket" button and a "cancel issue" button.

If the ticket purchase screen is updated as shown in FIG. 15B, then the customer points and specifies the "issue ticket" button in the ticket purchase screen when purchasing a ticket of the displayed seat, and points and specifies the "cancel issue" button when canceling the purchase. As a result, information indicating the button specified by the customer is input to the control unit 22. The step 110 yields an affirmative decision, and the processing proceeds to step 112.

At the step 112, it is determined whether the button specified by the customer is the "issue ticket" button. In the case of a negative decision, the button specified by the customer is regarded as the "cancel issue" button, and the ticket purchase processing program is finished.

On the other hand, if the step 112 yields an affirmative decision, then the processing proceeds to step 114, and the ticket purchase screen is updated as shown in FIG. 15C. Thereafter, at step 116, an order of ticket printing is issued to the printer 30 by using the information concerning the seat and concert and the document ID information DID received at the step 106.

Figure 16:
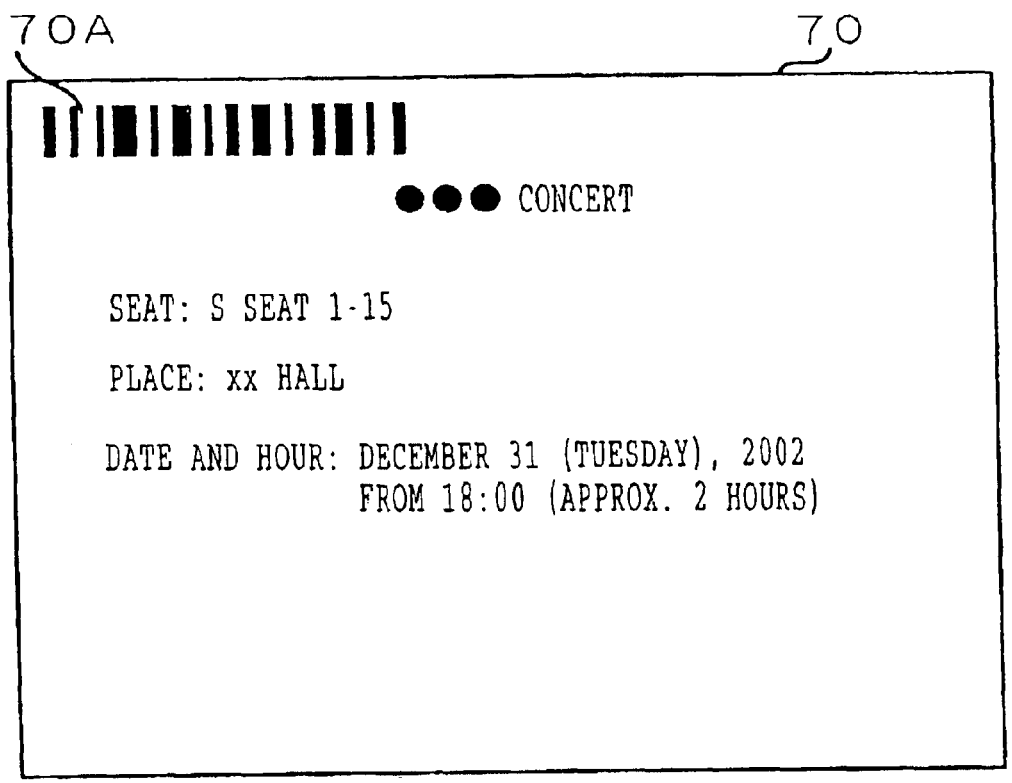
FIG. 16 is a schematic diagram showing an example of a ticket.

FIG. 16 shows an example of a ticket 70 serving as a document printed by the printer 30 according to the order of ticket printing. As shown in FIG. 16, information of the concert name, the seat number, the place and the date and hour is printed on the ticket 70 in the same way as ordinary tickets. In addition, a bar code 70A indicating the document ID information DID is printed.

Besides execution of the printing on the ticket 70 as shown in FIG. 16, in the printer 30, an image of a predetermined rectangular region (which is, in the present embodiment, a region including the upper left corner of the ticket 70 and the bar code 70A) is read out by the image sensor 38A, and resultant image data is output to the terminal device 20.

At subsequent step 118, therefore, inputting of the image data from the image sensor 38A of the printer 30 is waited for.

At subsequent step 120, the ticket purchase screen displayed on the display 25 is updated as shown in FIG. 15D. At subsequent step 122, inputting of predetermined information is waited for. When the ticket purchase screen is updated as shown in FIG. 15D, the customer verifies the contents of the ticket 70 printed by the printer 30. If there is no problem of false printing, then the customer points and specifies a "verify ticket" button displayed on the ticket purchase screen with the mouse. If there is a problem, then the customer points and specifies a "cancel issue" button with the mouse. As a result, information indicating the button specified by the customer is input to the control unit 22. The step 122 yields an affirmative decision, and the processing proceeds to step 124.

At the step 124, it is determined whether the button specified by the customer is the "verify ticket" button. In the case of a negative decision, the button specified by the customer is regarded as the "cancel issue" button, and the ticket purchase processing program is finished.

On the other hand, if the step 124 yields an affirmative decision, then the processing proceeds to step 126. After the information registration processing program shown in FIG. 21 has been executed, the ticket purchase processing program is finished.

In the information registration processing program executed at the step 126, a feature vector is calculated from image data input from the printer 30 at the step 118, and processing of registering the feature vector in the document management database DB1 as feature information is conducted.

Calculation of the feature vector will now be described. For calculation of the feature vector, a conventional known technique can be adopted. Hereafter, an example thereof will be described.

A result obtained by reading a printed image with the image sensor 38A is partitioned (quantized) into meshes (the number of meshes d=vertical M by horizontal N) each having a suitable size. Each mesh is represented (sampled) by a certain density value (density level q), and converted to a mosaic-shaped image. Denoting a density of a jth mesh by $x_j$, the pattern can be described by using a vector $x=(x1, x2, \ldots, xd)^t$ (where t represents transposition) after such quantization and sampling. This vector is called feature vector. Each element of the vector gives a density of a corresponding image region. The obtained pattern is represented as one point on a feature space formed by the feature vector.

Figure 17A:
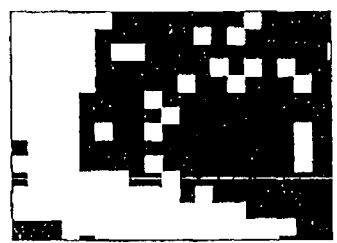
FIGS. 17A to 17C show examples obtained by conducting quantization and sampling on readout results of printed images shown in FIGS. 1A to 1C.
Figure 17B:
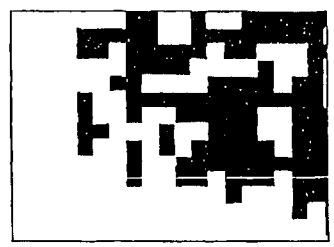
Figure 17C:
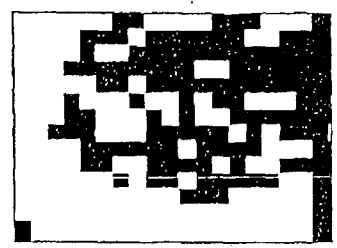
Figure 18A:
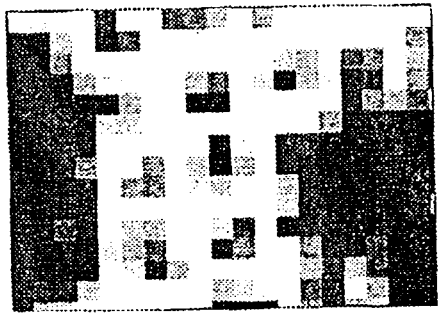
FIGS. 18A to 18C and FIGS. 18D to 18F show examples obtained by conducting quantization and sampling on readout results of printed images shown in FIGS. 2B to 2D.
Figure 18D:
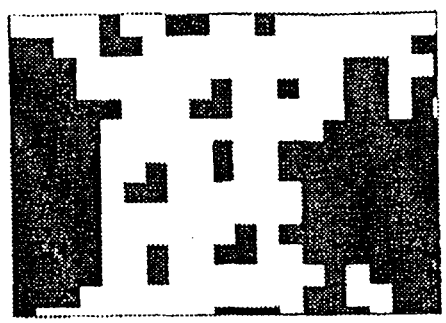
Figure 18B:
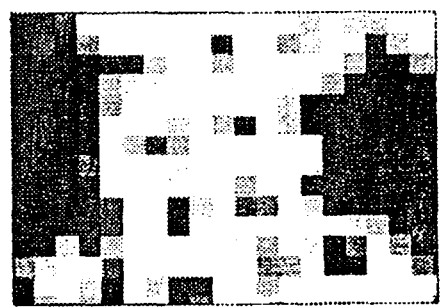
Figure 18E:
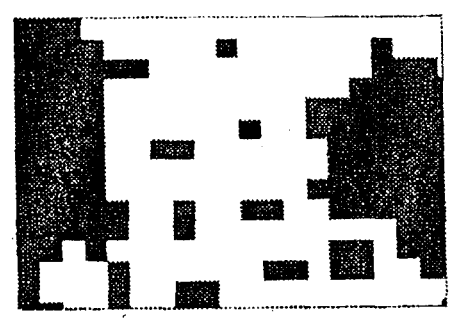
Figure 18C:
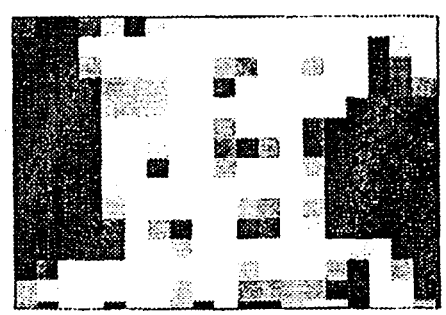
Figure 18F:
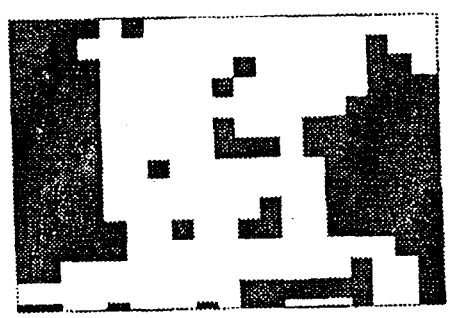
Figure 19A:
FIGS. 19A and 19B show examples obtained by conducting quantization and sampling on readout results of printed images shown in FIGS. 3B and 3C.
Figure 19B:
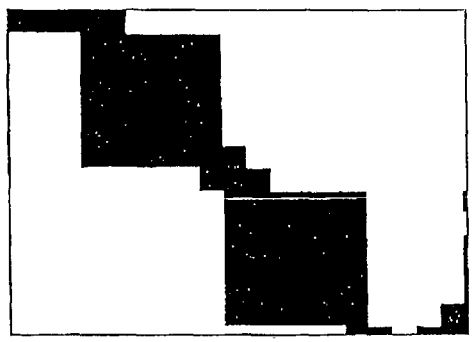
Figure 20A:
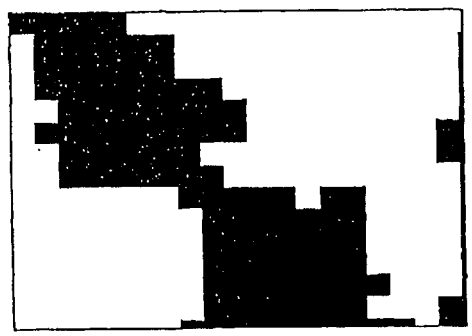
FIGS. 20A to 20C show examples obtained by conducting quantization and sampling on readout results of printed images shown in FIGS. 4A to 4C.
Figure 20B:
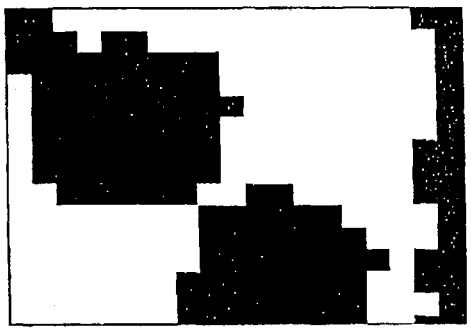
Figure 20C:
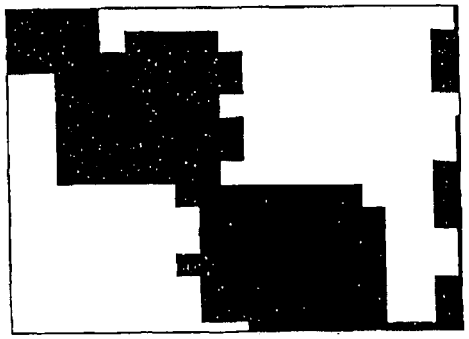

FIGS. 17A to 20C show examples obtained by quantizing and sampling printed images (results of copying and results of printing) shown in FIGS. 1A to 4C. FIGS. 17A to 17C show examples obtained by quantizing reading results of printed images shown in FIGS. 1A to 1C every 20 by 20 pixels and sampling them into two gradations. FIGS. 18A to 18C show examples obtained by quantizing reading results of printed images shown in FIGS. 2B to 2D every 20 by 20 pixels and sampling them into 255 gradations. FIGS. 18D to 18F show examples obtained by quantizing reading results of printed images shown in FIGS. 2B to 2D every 20 by 20 pixels and sampling them into two gradations. FIGS. 19A and 19B show examples obtained by quantizing reading results of printed images shown in FIGS. 3B and 3C every 20 by 20 pixels and sampling them into two gradations. FIGS. 20A to 20C show examples obtained by quantizing reading results of printed images shown in FIGS. 4A to 4C every 20 by 20 pixels and sampling them into two gradations.

As will be appreciated from FIGS. 17A to 20C, microscopically different patterns are obtained from printed images, respectively. Therefore, feature vectors also become vectors representing unique features, respectively. In other words, a feature of a nonreproducible random pattern can be represented by the feature vector.

Since a nonreproducible random pattern is included in each image itself printed on a printed matter as shown in FIGS. 1A to 4C, image data obtained as a result of reading may be used as a feature of the nonreproducible random pattern. By quantizing and sampling image data obtained by reading an image printed on a printed matter as shown in FIGS. 17A to 20C and deriving a feature vector as in the present embodiment, however, a feature of a nonreproducible random pattern for each printed matter becomes clearer and each can be discriminated easily.

Figure 21:
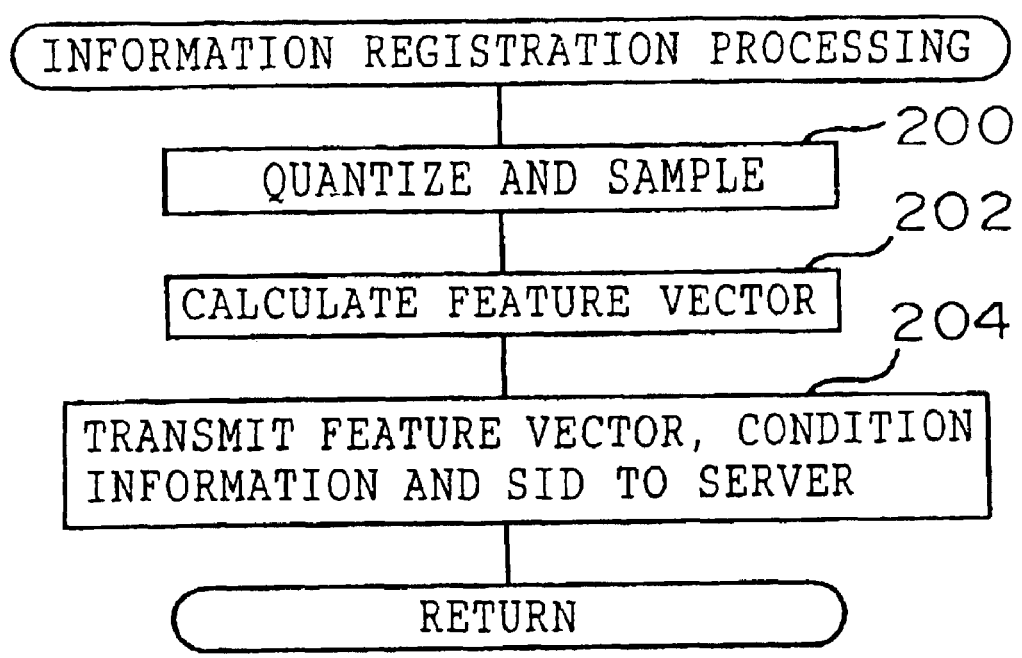
FIG. 21 is a flow chart showing a processing flow of an information registration processing program according to a first embodiment of the present invention.

With reference to FIG. 21, the information registration processing program executed at the step 126 of the ticket purchase processing program will now be described. FIG. 21 is a flow chart showing a processing flow of the information registration processing program. The case where the control unit 22 in the terminal device 20 previously grasps the condition information concerning the connected printer 30 and the reading unit ID information SID of the image sensor 38A incorporated in the printer 30 will now be described.

At step 200 in FIG. 21, the image data input from the printer 30 at the step 118 of the ticket purchase processing program is quantized and sampled by using predetermined steps, and converted to a mosaic-shaped image. The processing proceeds to step 202, where a feature vector is calculated from image data obtained after the quantization and sampling.

At subsequent step 204, feature information representing the calculated feature vector, the condition information of the connected printer 30 and the reading unit ID information SID of the image sensor 38 A provided in the printer 30 are transmitted to the server 12. Thereafter, the information registration processing program is finished.

Upon receiving the feature information, the condition information and the reading unit ID information SID, the server 12 associates the information with document ID information DID transmitted to the terminal device 20 of the access source in the midst of the execution of the ticket purchase processing program, and stores (registers) the information associated with the document ID information DID in the document management database DB1 of the hard disk 18.

On the other hand, the customer goes to the concert hall with the ticket 70 printed by the printer 30, and undergoes a check as to whether the brought ticket 70 is the original in the terminal device 40 provided at the entrance of the concert hall. At this time, a clerk in charge sets the ticket brought by the customer in a predetermined position of the scanner 50, and then document verification processing is executed by the terminal device 40.

Figure 22:
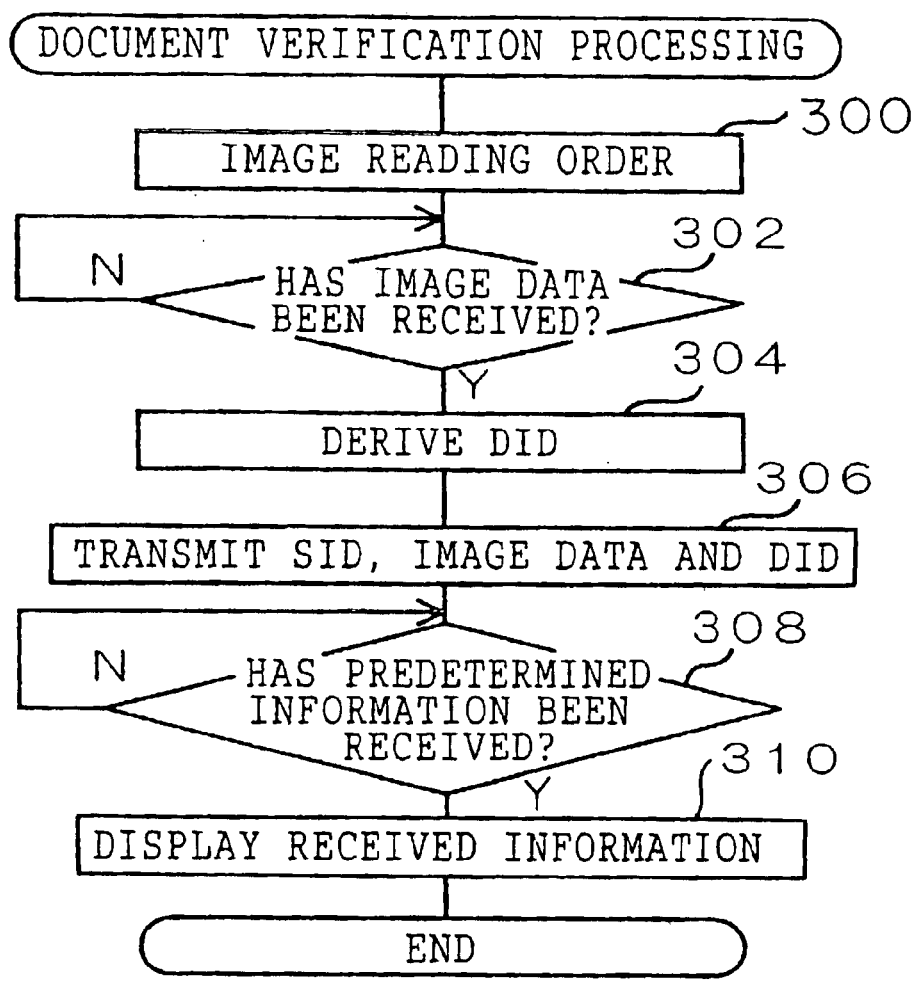
FIG. 22 is a flow chart showing a processing flow of a document verification processing program according to a first embodiment of the present invention.

With reference to FIG. 22, the document verification processing will now be described. FIG. 22 is a flow chart showing a processing flow of a document verification processing program executed by the control unit 42 in the terminal device 40 when executing the document verification processing.

At step 300, the scanner 50 is ordered to read an image by using the image sensor 56A. As a result, the scanner 50 reads an image according to the order, and outputs image thus obtained to the terminal device 40.

At subsequent step 302, reception of the image data is waited for. At subsequent step 304, document ID information DID indicated by the bar code 70A is derived on the basis of image data of the bar code 70A included in the received image data. At subsequent step 306, reading unit ID information SID is read out from the memory 58 in the scanner 50, and the reading unit ID information SID, the received image data and the derived document ID information DID are transmitted to the server 12. In response to this, the server 12 determines whether the ticket set in the scanner 50 is the original on the basis of the received image data, and transmits information indicating a result of the decision to the terminal device 40 of the access source.

At subsequent step 308, reception of information indicating the decision result is waited for. At subsequent step 310, the decision result indicated by the received information is displayed on the display 45. Thereafter, the document verification processing program is finished.

Only when the decision result displayed on the display 45 in the terminal device 40 indicates that the brought ticket is the original, the clerk in charge permits the customer to enter the concert hall.

Figure 23:
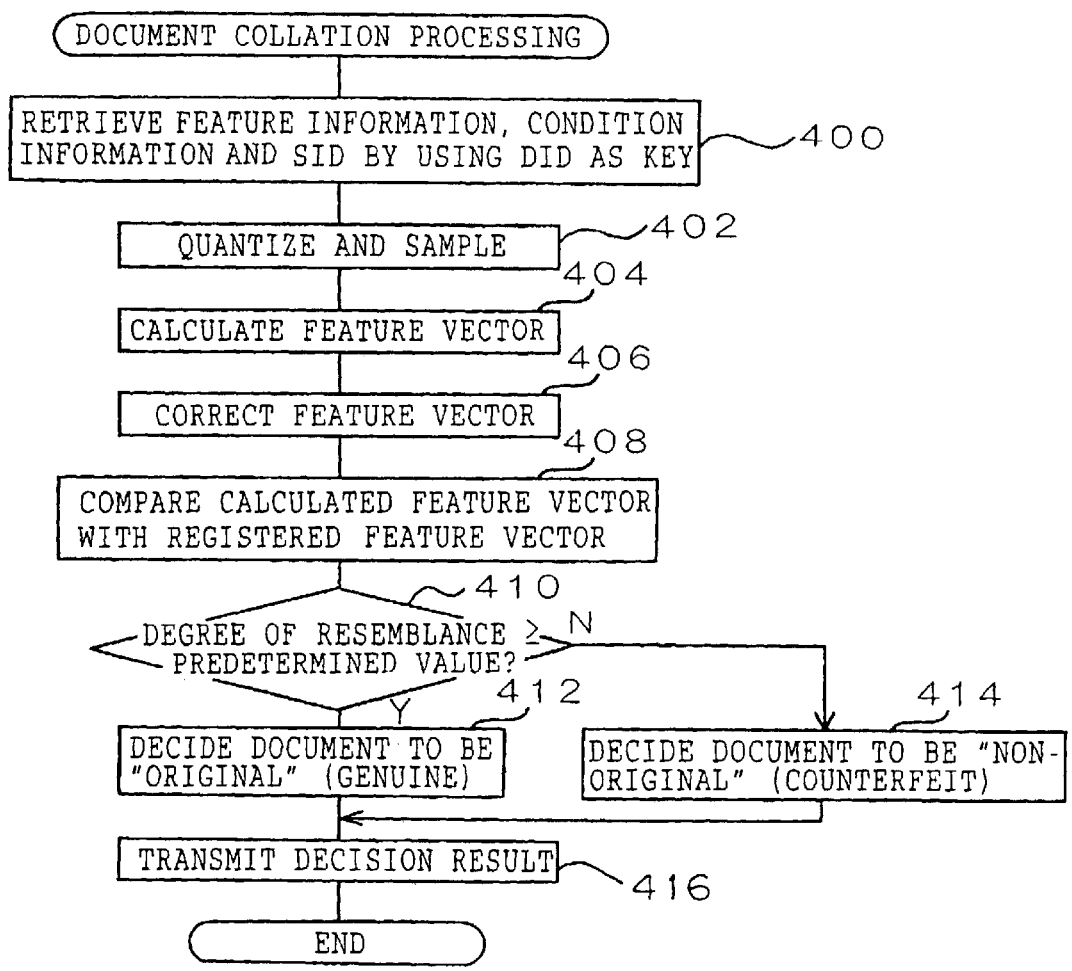
FIG. 23 is a flow chart showing a processing flow of a document collation processing program according to a first embodiment of the present invention.

With reference to FIG. 23, document collation processing executed by the server 12 will now be described. FIG. 23 is a flow chart showing a processing flow of a document collation processing program executed in the control unit 14 in the server 12 when the reading unit ID information SID, the image data and the document ID information DID have been received from the terminal device 40.

At step 400 in FIG. 23, feature information (hereafter referred to as "registered feature vector"), condition information and reading unit ID information SID are retrieved from the document management database DB1 by using the document ID information DID received from the terminal device 40 as a key. At subsequent step 402, the received image data is quantized and sampled by using predetermined steps, and converted to a mosaic-shaped image. At subsequent step 404, a feature vector (hereafter referred to as "calculated feature vector") is calculated. Since the processing conducted at the step 402 and the step 404 is similar to that conducted at the step 200 and the step 202 in the information registration processing program (see FIG. 21), detailed description thereof will be omitted.

At subsequent step 406, condition information associated with the same reading unit ID information SID as the reading unit ID information SID received from the terminal device 40 is acquired from the sensor management database DB2. By using the condition information thus acquired (hereafter referred to as "first condition information") and the condition information acquired at the step 400 (hereafter referred to as "second condition information"), the calculated feature vector is corrected so as to make the characteristic of the calculated feature vector coincide with the characteristic of the registered feature vector.

As for examples of the correction, if the sensitivity of the image sensor indicated by the first condition information is higher than the sensitivity of the image sensor indicated by the second condition information, then the value of the calculated feature vector is decreased by a quantity corresponding to the sensitivity difference. If the sensitivity of the image sensor indicated by the first condition information is lower than the sensitivity of the image sensor indicated by the second condition information, then the value of the calculated feature vector is increased by a quantity corresponding to the sensitivity difference.

At subsequent step 408, the calculated feature vector corrected at the step 406 is compared with the registered feature vector. On the basis of the reference position and size on the document, of the region from which the registered feature vector has been picked, included in the condition information acquired at the step 400, the same regions on the image of the calculated feature vector and the registered feature vector are compared with each other.

If as a result of the comparison the degree of resemblance between them is at least a preset predetermined threshold, then the processing proceeds from step 410 to step 412, and the ticket to be collated is decided to be "the original" (genuine article). Otherwise, the processing proceeds from step 410 to step 414, and the ticket is decided to be "the non-original" (spurious article).

To be more precise, the distance between the calculated feature vector and the registered feature vector is derived. If the distance is shorter than a preset predetermined threshold, then the ticket is decided to be "the original." If the distance is longer than the preset predetermined threshold, then the ticket is decided to be "non-original."

As for the threshold used at this time, it is desirable to set the threshold with a predetermined tolerance by taking errors of the calculated feature vector and the registered feature vector (such as reading errors in the reading unit 38 and the reading unit 56, and quantization and sampling errors) into account. In other words, the magnitude of the threshold may be suitably selected according to a request as to whether the genuineness decision should be strict or loose. In some cases, the threshold differs according to the ticket 70. At the time of feature vector registration, it is desirable to preserve the threshold as well together with the document ID information DID in the document management database DB1.

In some cases, accidents, such as some operation mistakes or position misalignments, occur at the time of collation. Therefore, a final decision may be made on the basis of a plurality of decision results. Or, in the case where a document is not decided to be the original as a result of comparison, retrial may be permitted until a predetermined number of times is reached.

If the ticket to be collated is decided to be the original, then the control unit 14 erases information concerning the ticket included in the document management database DB1.

Finally, at step 416, information indicating the decision result obtained by the processing heretofore described is transmitted to the terminal device 40 of the access source. Thereafter, the document collation processing program is finished.

Thus, in the document verification system 10A and the document verification method according to the present embodiment, the terminal device 20 acquires feature information indicating a feature of a nonreproducible disorder portion in a printing region on a document serving as the original, as a registered feature vector, and stores the registered feature vector on the hard disk 18, and the server 12 acquires the same information as the registered feature vector in a document to be verified as to whether the document is the original, as a calculated feature vector, reads out the registered feature vector from the hard disk 18, compares the acquired calculated feature vector with the registered feature vector read out, and verifies whether the document to be verified is the original on the basis of a result of the comparison. Therefore, it is possible to verify whether the document is the original at low cost and with ease.

In the document verification system 10A and the document verification method according to the present embodiment, the Internet 60 is interposed among the hard disk 18, the terminal device 20 and the server 12. Therefore, it becomes possible to dispose devices in mutually remote places, and convenience can be improved.

In the document verification system 10A and the document verification method according to the present embodiment, the terminal device 20 acquires condition information indicating conditions used when the registered feature vector was obtained from a document serving as the original, and stores the acquired condition information on the hard disk 18, and the server 12 reads out the condition information from the hard disk 18, and corrects the calculated feature vector so as to make the characteristic of the calculated feature vector coincide with the characteristic of the registered feature vector on the basis of the condition information thus read out. Therefore, the precision of verification as to whether the document to be verified is the original can be improved.

In the document verification system 10A and the document verification method according to the present embodiment, identification information (document ID information DID) is recorded on a document serving as the original, and the identification information is previously stored on the hard disk 18 so as to be associated with the registered feature vector of the document, and when verifying a document to be verified, identification information recorded on the document is read out and a registered feature vector associated with identification information coinciding with the identification information thus read out is used to verify the document. Therefore, a plurality of originals can be dealt with.

Figure 31:
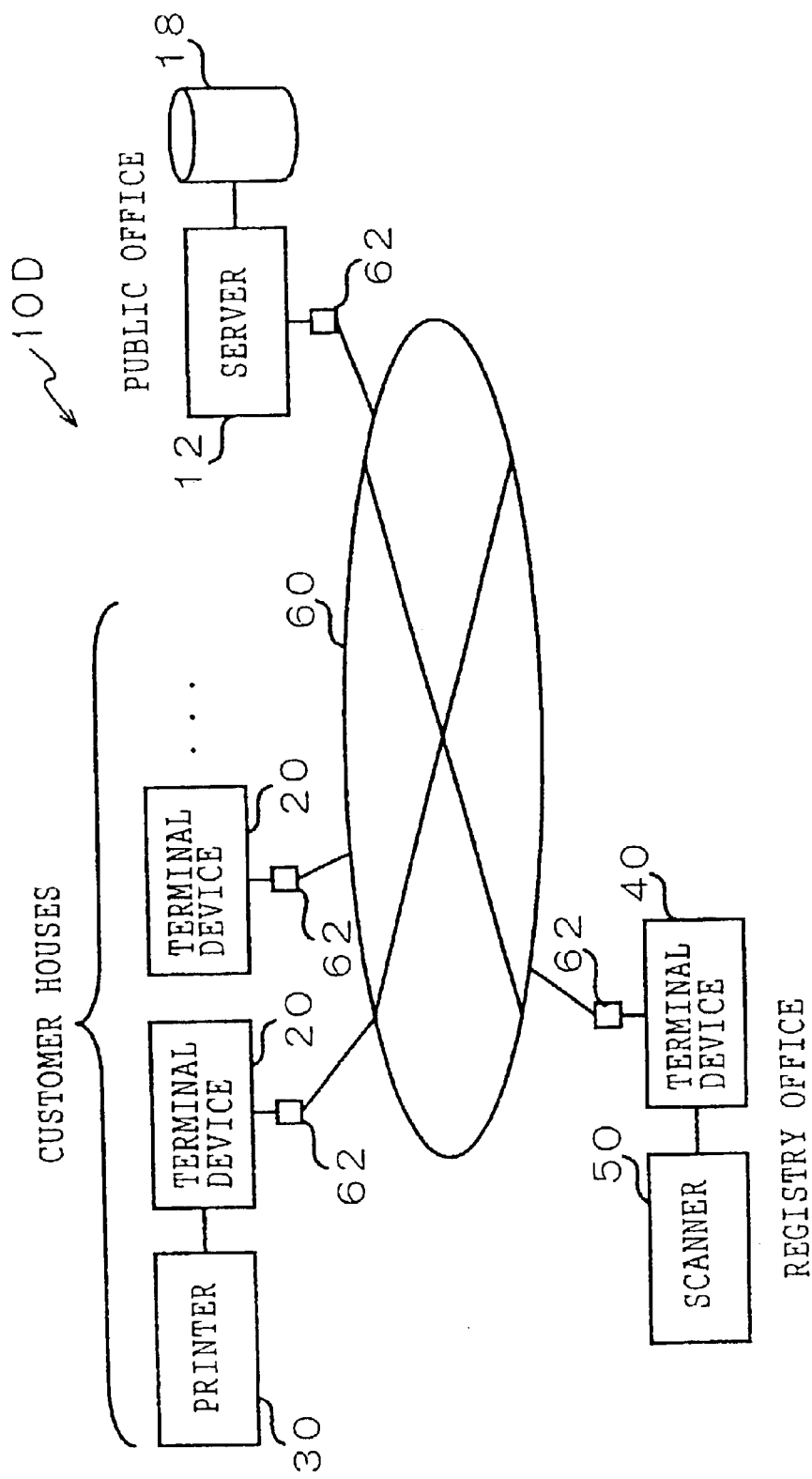
FIG. 31 is a block diagram showing another configuration of a document verification system according to a first embodiment of the present invention.

In the present embodiment, the case where the invention is applied to document verification service in which a concert ticket is used as the document of the invention and printed by the printer 30 installed in each customer's house and it is verified at an entrance of a concert hall whether the ticket is the original has been described. However, the invention is not limited to the case. For example, the invention can be applied as document verification service in which a resident card is used as the document of the invention and printed by the printer 30 installed in each customer's house and it is verified in a place where a procedure for verifying a resident card is conducted (such as a registry office, a passport issuance office, and a license issuance office) whether the resident card is the original. In this case, the document verification system 10A shown in FIG. 5 becomes a document verification system 10D as shown in FIG. 31, in which the service provider becomes a public office and the installation place of the terminal device 40 becomes a registry office.

In this case, when each customer requests via the terminal device 20 that a resident card should be printed by the printer 30, it is desirable to conduct personal authentication of the customer by means of authentication using a secret identification number or biometrics authentication. In this case as well, effects similar to those of the present embodiment can be brought about.

In the present embodiment, the case where the document verification device of the invention is applied to the server 12 has been described. However, the invention is not limited to this, but the document verification device of the invention may be applied to the terminal device 40. In this case, not only the document verification processing program (see FIG. 22), but also the document collation processing program (see FIG. 23) is executed. In this case, however, it is not necessary to execute the processing of the step 306 and the step 308 in the document verification processing program and the processing of the step 416 in the document collation processing program. In this case as well, effects similar to those of the present embodiment can be brought about.

SECOND EMBODIMENT

Figure 24:
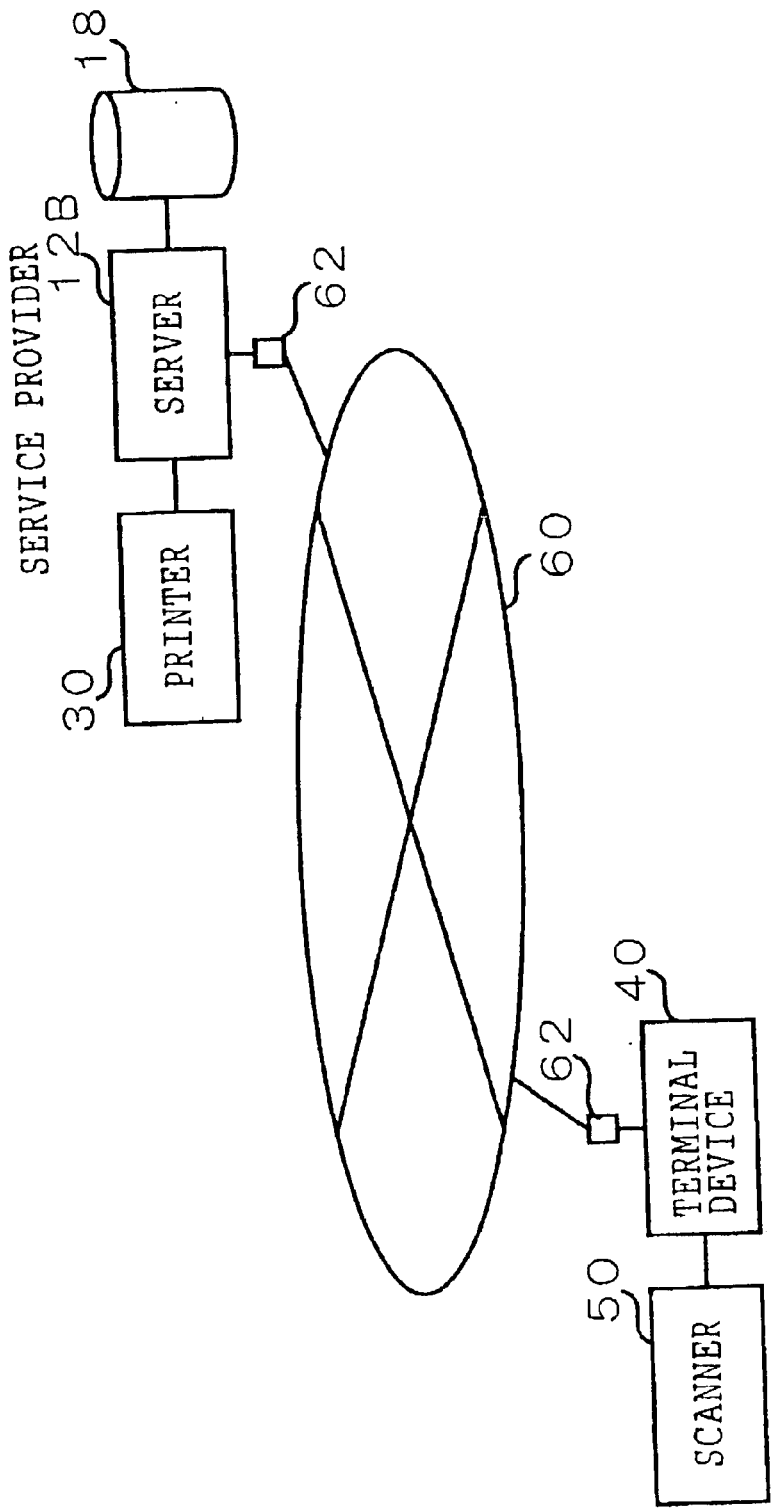
FIG. 24 is a block diagram showing a configuration of a document verification system according to a second embodiment of the present invention.

In the second embodiment, the case where the invention is applied to a document verification system in which a document serving as the original is printed by a service provider and a document to be verified as to whether it is the original is verified outside a customer's house will now be described. First, a configuration of a document verification system 10B according to the present embodiment will now be described with reference to FIG. 24. In FIG. 24, the same components as those in FIG. 5 are denoted by the same reference characters, and description thereof will be omitted.

As shown in FIG. 24, the document verification system 10B according to the present embodiment differs from the document verification system 10A according to the first embodiment only in that the terminal devices 20 owned by customers are not included and the server 12 is replaced by a server 12B having a printer 30 connected thereto.

Figure 25:
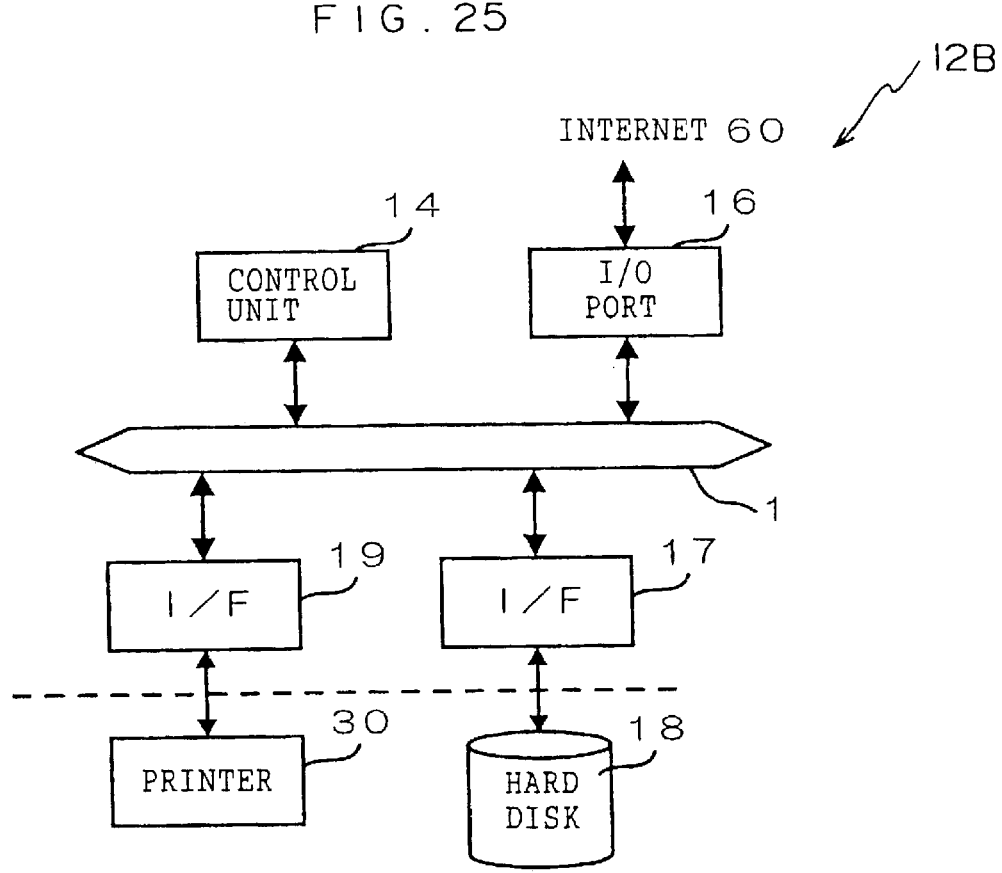
FIG. 25 is a block diagram showing a configuration of an electric system of a server.

With reference to FIG. 25, a configuration of an electric system in the server 12B will now be described. In FIG. 25, the same components as those in FIG. 6 are denoted by the same reference characters, and description thereof will be omitted.

As shown in FIG. 25, the server 12B according to the present embodiment differs from the server 12 according to the first embodiment only in that an interface unit 19 for connecting the printer 30 is newly provided and connected to the bus 1. Therefore, the control unit 14 in the server 12B can receive/send various kinds of information from/to the printer 30 via the bus 1 and the interface unit 19.

Configurations of the hard disk 18, the printer 30, the terminal device 40 and the scanner 50 are the same as those according to the first embodiment, and consequently description thereof will be omitted.

In this case, the server 12B corresponds to an information registration device and a document verification device of the invention.

Operation of the document verification system 10B according to the present embodiment will now be described. The case where the invention is applied to document verification service in which a coupon ticket that can be used in restaurants is used as the document of the invention and a service provider prints a plurality of sheets of the coupon ticket by using the printer 30 connected to the server 12B and verifies in billing places of the restaurants whether the coupon ticket is the original will now be described. In this case, the terminal device 40 and the scanner 50 are installed in a billing place in each of a plurality of restaurants.

Figure 26:
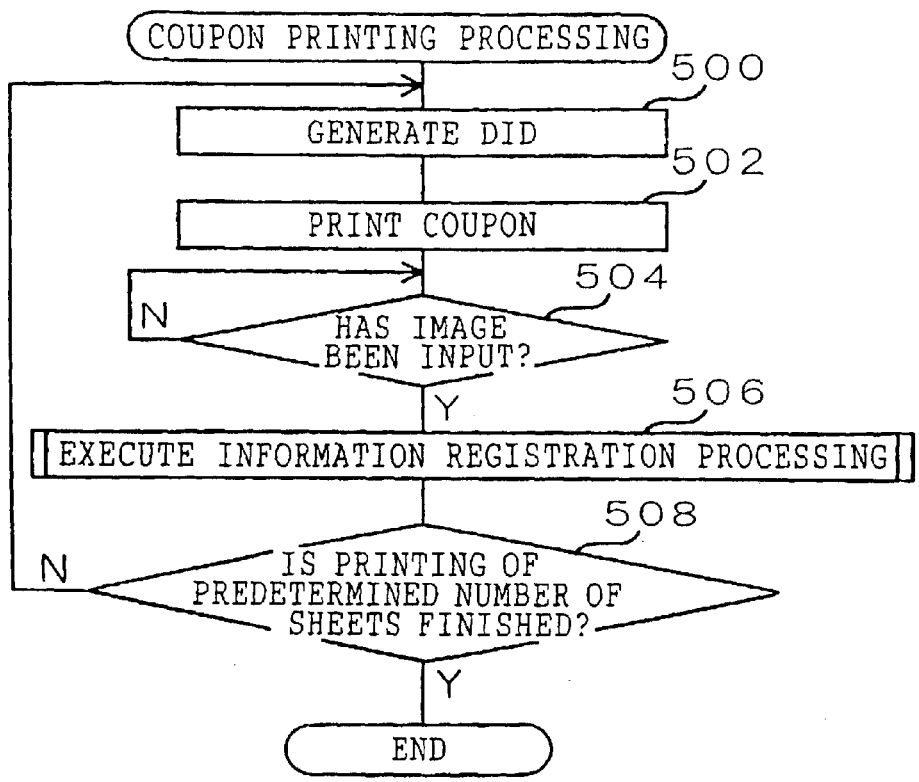
FIG. 26 is a flow chart showing a processing flow of a coupon printing processing program according to a second embodiment of the present invention.

First, coupon printing processing executed in the server 12B will now be described with reference to FIG. 26. FIG. 26 is a flow chart showing a processing flow of a coupon printing processing program, which is executed by the control unit 14 in the server 12B when the service provider prints a predetermined number of coupon tickets.

At step 500 shown in FIG. 26, document ID information DID that is not previously registered at that time point is generated. At subsequent step 502, a coupon ticket printing order is given to the printer 30 by using design information indicating a predetermined design of a coupon ticket and the document ID information DID generated at the step 500. As a result, the printer 30 prints a coupon ticket that includes a bar code (a bar code having a state similar to that of the bar code 70 A shown in FIG. 16) indicating a document ID information DID and has a design indicated by the design information. In addition, an image of a predetermined region on the coupon ticket is read by the image sensor 38A, and image data thus obtained is output to the server 12B.

At subsequent step 504, inputting of the image data from the image sensor 38A in the printer 30 is waited for. At subsequent step 506, an information registration processing program described later (see FIG. 27) is executed. Thereafter, the processing proceeds to step 508.

At the step 508, it is determined whether printing of a predetermined number of sheets of the coupon ticket has been finished. In the case a negative decision, the processing returns to the step 500. The processing of the step 500 to step 506 is executed repeatedly. When an affirmative decision is obtained, the coupon printing processing program is finished.

Figure 27:
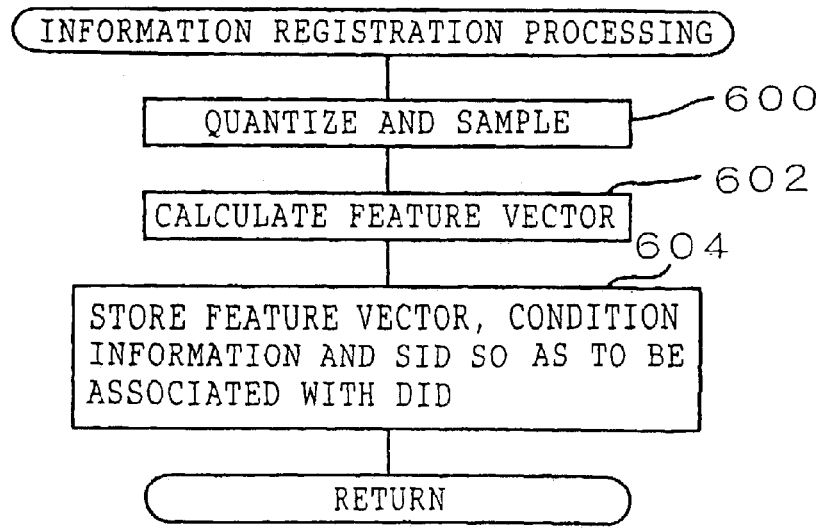
FIG. 27 is a flow chart showing a processing flow of an information registration processing program according to a second embodiment of the present invention.

With reference to FIG. 27, the information registration processing program executed at the step 506 in the coupon printing processing program will now be described. FIG. 27 is a flow chart showing a processing flow of the information registration processing program. The case where the condition information concerning the connected printer 30 and the reading unit ID information SID are previously stored in the memory incorporated in the control unit 14 in the server 12B will now be described.

At step 600 in FIG. 27, the image data input from the printer 30 at the step 504 of the coupon printing processing program is quantized and sampled by using predetermined steps, and converted to a mosaic-shaped image. The processing proceeds to step 602, where a feature vector is calculated from image data obtained after the quantization and sampling. Since the processing conducted at the step 600 and the step 602 is similar to that conducted at the step 200 and the step 202 in the information registration processing program (see FIG. 21) according to the first embodiment, detailed description thereof will be omitted.

At subsequent step 604, feature information representing the calculated feature vector, the condition information of the connected printer 30 and the reading unit ID information SID of the printer 30 are stored (registered) in the document management database DB1 so as to be associated with the document ID information DID generated at the step 500 in the coupon printing processing program. Thereafter, the information registration processing program is finished.

The information registration processing program heretofore described is executed every time a coupon ticket is printed. As a result, the document management database DB1 is constructed and updated.

The service provider distributes the coupon tickets obtained by the processing heretofore described to a plurality of selling agents such as convenience stores. Therefore, the customer purchases the coupon ticket at the selling agent, goes to some of a plurality of restaurants each having the terminal device 40 and the scanner 50 with the coupon ticket, and undergoes a check as to whether the brought coupon ticket is the original, using the terminal device 40 in the restaurant after taking a meal. At this time, a clerk in charge sets the ticket brought by the customer in a predetermined position of the scanner 50, and then document verification processing is executed by using the terminal device 40.

Figure 28:
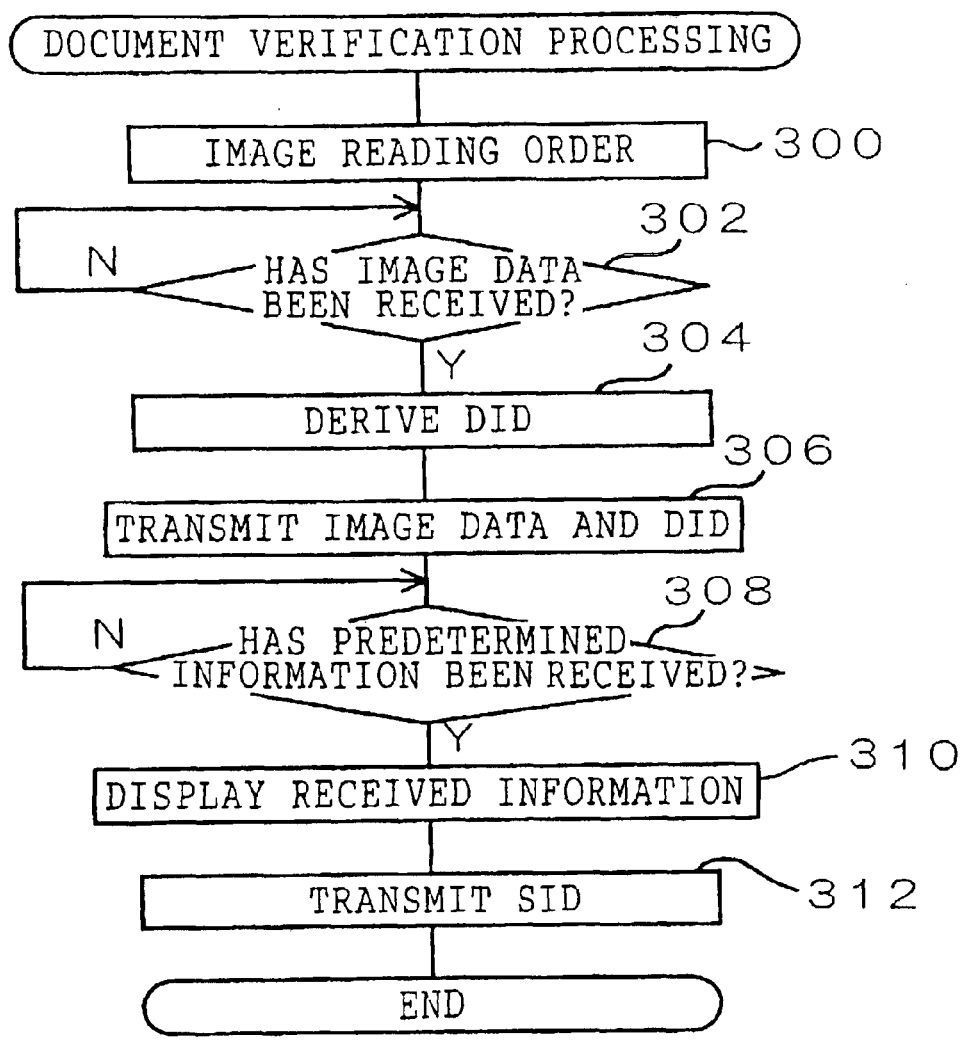
FIG. 28 is a flow chart showing a processing flow of a document verification processing program according to a second embodiment of the present invention.

With reference to FIG. 28, the document verification processing will now be described. FIG. 28 is a flow chart showing a processing flow of a document verification processing program executed by the control unit 42 in the terminal device 40 when executing the document verification processing. Steps at which the same processing as that in the document verification processing program according to the first embodiment shown in FIG. 22 is conducted are denoted by the same step numbers, and description thereof will be omitted.

As shown in FIG. 28, the document verification processing program according to the present embodiment differs from the document verification processing program according to the first embodiment only in that processing of step 312 is added. At the step 312, the reading unit ID information SID of the connected scanner 50 is read out from the memory 58 in the scanner 50, and transmitted to the server 12B.

Therefore, the server 12B can identify the utilization place of the coupon ticket by reading out installation place information associated with the received reading unit ID information SID from the sensor management database DB2. Furthermore, the server 12B can identify the utilization time of the coupon ticket as well on the basis of the reception time of the reading unit ID information SID. By accumulating information of the utilization place and the utilization time, therefore, information concerning coupon tickets and restaurant management, which is useful for marketing development, can be obtained.

Upon receiving the image data and the document ID information DID transmitted from the terminal device 40 by the processing at the step 306 in the document verification processing program (see FIG. 28), the server 12B executes the document collation processing program (see FIG. 23) similar to that in the first embodiment.

Thus, in the document verification system 10B and the document verification method according to the present embodiment, the server 12B acquires feature information indicating a feature of a nonreproducible disorder portion in a printing region on a document serving as the original, as a registered feature vector, and stores the registered feature vector on the hard disk 18, and when verifying a document to be verified as to whether it is the original, the server 12B acquires the same information as the registered feature vector in the document to be verified as a calculated feature vector, reads out the registered feature vector from the hard disk 18, compares the acquired calculated feature vector with the registered feature vector read out, and verifies whether the document to be verified is the original on the basis of a result of the comparison. Therefore, it is possible to verify whether the document is the original at low cost and with ease.

In the document verification system 10B and the document verification method according to the present embodiment, the server 12B acquires condition information indicating conditions used when the registered feature vector was obtained from a document serving as the original, and stores the acquired condition information on the hard disk 18, and when verifying a document, the server 12 reads out the condition information from the hard disk 18, and corrects the calculated feature vector so as to make the characteristic of the calculated feature vector coincide with the characteristic of the registered feature vector on the basis of the condition information thus read out. Therefore, the precision of verification as to whether the document to be verified is the original can be improved.

In the document verification system 10B and the document verification method according to the present embodiment, identification information (document ID information DID) is recorded on a document serving as the original, and the identification information is previously stored on the hard disk 18 so as to be associated with the registered feature vector of the document, and when verifying a document to be verified, identification information recorded on the document is readout and a registered feature vector associated with identification information coinciding with the identification information thus read out is used to verify the document. Therefore, a plurality of originals can be dealt with.

In the document verification system 10B and the document verification method according to the present embodiment, the position information (installation place information) indicating the installation positions of devices, i.e., the printer 30 and the scanner 50, and device identification information (reading unit ID information SID), which can identify the devices, are further stored on the hard disk 18 so as to be associated with each other, the memory 58 storing corresponding device identification information is provided in the scanner 50, and device identification information stored in the memory 58 is transmitted to the outside. By receiving the device identification information and reading out position information associated with the device identification information from the hard disk 18, the location of the device that has transmitted the device identification information can be identified easily.

THIRD EMBODIMENT

Figure 29:
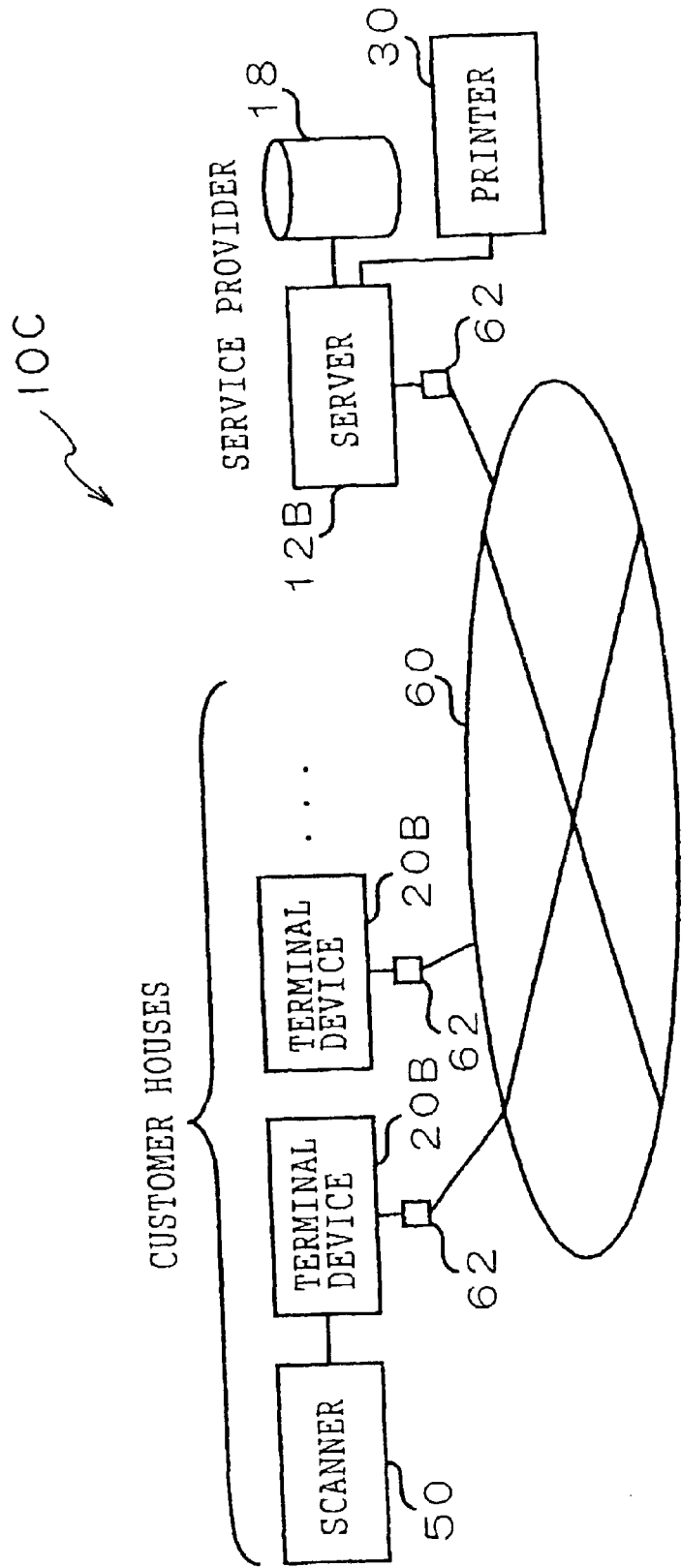
FIG. 29 is a block diagram showing a configuration of a document verification system according to a third embodiment of the present invention.

In the third embodiment, the case where the invention is applied to a document verification system in which a document serving as the original is printed by a service provider and a document to be verified as to whether it is the original is verified within a customer's house will now be described. First, a configuration of a document verification system 10C according to the present embodiment will now be described with reference to FIG. 29. In FIG. 29, the same components as those in FIG. 5 are denoted by the same reference characters, and description thereof will be omitted.

As shown in FIG. 29, the document verification system 10C according to the present embodiment differs from the document verification system 10A according to the first embodiment only in that the terminal device 40 is not included, the server 12 is replaced by a server 12B in the same way as the second embodiment, and the terminal device 20 installed in each customer's house is replaced by a terminal device 20B having the scanner 50 connected thereto instead of the printer 30.

Figure 30:
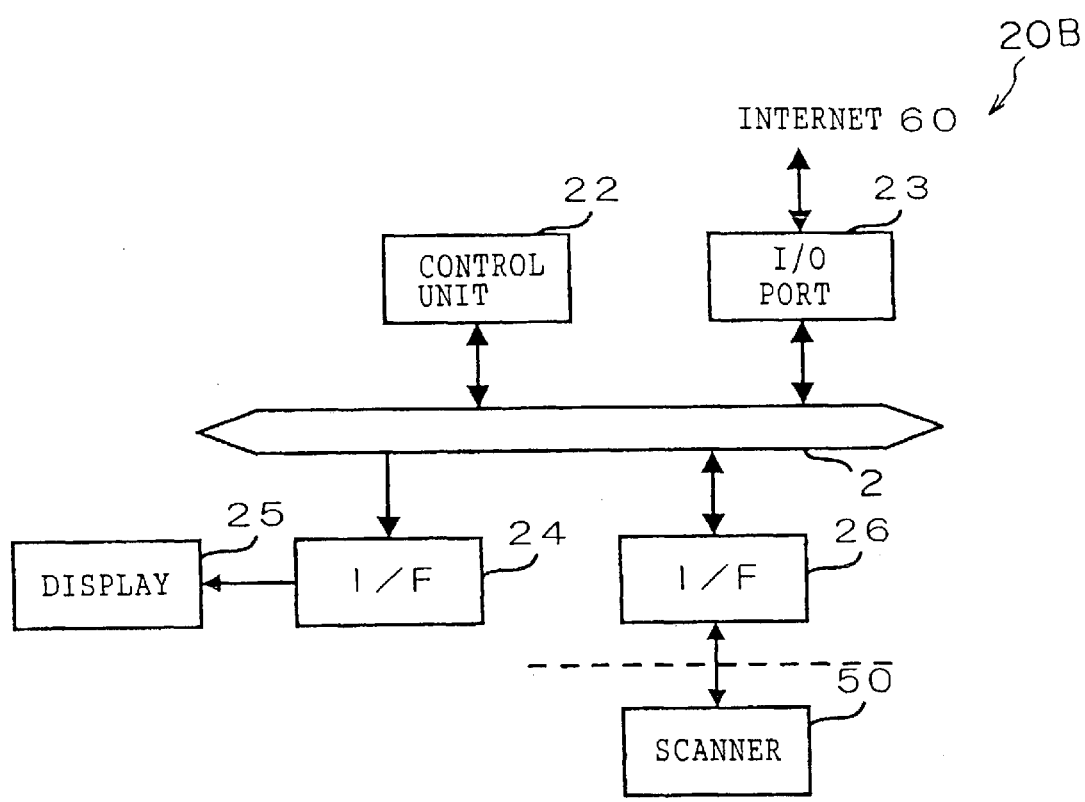
FIG. 30 is a block diagram showing a configuration of an electric system of a terminal device.

With reference to FIG. 30, a configuration of an electric system in the terminal device 20B will now be described. In FIG. 30, the same components as those in FIG. 10 are denoted by the same reference characters, and description thereof will be omitted.

As shown in FIG. 30, the terminal device 20B according to the present embodiment differs from the terminal device 20 according to the first embodiment only in that an interface unit 26 for connecting the scanner 50 is provided and connected to the bus 2. instead of the interface unit 26 for connecting the printer 30. Therefore, the control unit 22 in the terminal device 208 can receive/send various kinds of information from/to the scanner 50 via the bus 2 and the interface unit 26.

Configurations of the hard disk 18, the printer 30, and the scanner 50 are the same as those according to the first embodiment, and consequently description thereof will be omitted.

As an application example of the document verification system 10C according to the present embodiment, the following document verification service can be exemplified. A coupon ticket that can be used for shopping through the Internet, i.e., that can be used in the so-called net shopping is used as the document of the invention and a service provider prints a plurality of sheets of the coupon ticket by using the printer 30 connected to the server 12B and verifies whether the coupon ticket is the original by using the terminal device 20B provided in a customer's house via the Internet.

In this case, a coupon printing processing program (FIG. 26) similar to that in the second embodiment is executed in the server 12B. In the present embodiment, however, a coupon ticket printed by the printer 30 according to the processing conducted at the step 502 in the program includes a bar code (a bar code having a state similar to that of the bar code 70A shown in FIG. 16) indicating a document ID information DID, and has a design for net shopping.

The service provider distributes the coupon tickets obtained by the coupon printing processing to a plurality of selling agents such as convenience stores. Therefore, the customer purchases the coupon ticket at the selling agent. When conducting net shopping by using the terminal device 20B in the customer's house and conducting a procedure of paying the price, the customer sets the purchased coupon ticket in a predetermined position of the scanner 50 connected to the terminal device 20B, and then document verification processing is executed by using the terminal device 20B.

In this case, in the terminal device 20B, a document verification processing program (see FIG. 22) similar to that in the first embodiment is executed. In this case, however, a display for displaying a decision result indicated by information that is received in processing conducted at the step 308 of the program becomes the display 25 provided in the terminal device 20B.

In this case, in the server 12B, a document collation processing program (see FIG. 23) similar to that in the first embodiment is executed. However, if in this case the ticket to be collated is decided to be the original in the program, then the control unit 14 erases information concerning the coupon ticket in the document management database DB1.

Thus, in the document verification system 10C and the document verification method according to the present embodiment, the server 12B acquires feature information indicating a feature of a nonreproducible disorder portion in a printing region on a document serving as the original, as a registered feature vector, and stores the registered feature vector on the hard disk 18, and when verifying a document to be verified as to whether it is the original, the server 12B acquires the same information as the registered feature vector in the document to be verified as a calculated feature vector, reads out the registered feature vector from the hard disk 18, compares the acquired calculated feature vector with the registered feature vector read out, and verifies whether the document to be verified is the original on the basis of a result of the comparison. Therefore, it is possible to verify whether the document is the original at low cost and with ease.

In the document verification system 10C and the document verification method according to the present embodiment, the Internet 60 is interposed between the terminal device 20B and the server 12B. Therefore, it becomes possible to dispose devices in mutually remote places, and convenience can be improved.

In the document verification system 10C and the document verification method according to the present embodiment, the server 12B acquires condition information indicating conditions used when the registered feature vector was obtained from a document serving as the original, and stores the acquired condition information on the hard disk 18, and the server 12B reads out the condition information from the hard disk 18, and corrects the calculated feature vector so as to make the characteristic of the calculated feature vector coincide with the characteristic of the registered feature vector on the basis of the condition information thus read out. Therefore, the precision of verification as to whether the document to be verified is the original can be improved.

In the document verification system 10C and the document verification method according to the present embodiment, identification information (document ID information DID) is recorded on a document serving as the original, and the identification information is previously stored on the hard disk 18 so as to be associated with the registered feature vector of the document, and when verifying a document to be verified, identification information recorded on the document is read out and a registered feature vector associated with identification information coinciding with the identification information thus read out is used to verify the document. Therefore, a plurality of originals can be dealt with.

As an example, the case where a feature of a nonreproducible disorder portion in an image is used in order to verify originality of a document has been described. However, the present invention is not limited to this. The originality of a document can also be verified by using the surface state and/or the thickness-expressing spots state of paper used for the document. To be more precise, unevenness of the paper surface formed when fabricating paper used for the document 70, thickness of the fiber, quality (flaw) of the fiber, and the degree of transparency can be mentioned as the surface state. Since the surface state and the thickness-expressing spots state are formed depending upon overlapping of fibers when making paper of pulp in the paper manufacturing process and density nonuniformity of the pulp suspension used for paper making, they are unique states. These states cannot be reproduced even with the current copying technique. Therefore, the originality can be verified by using the surface state and/or the thickness-expressing spots state of paper used for the document.

Figure 32:
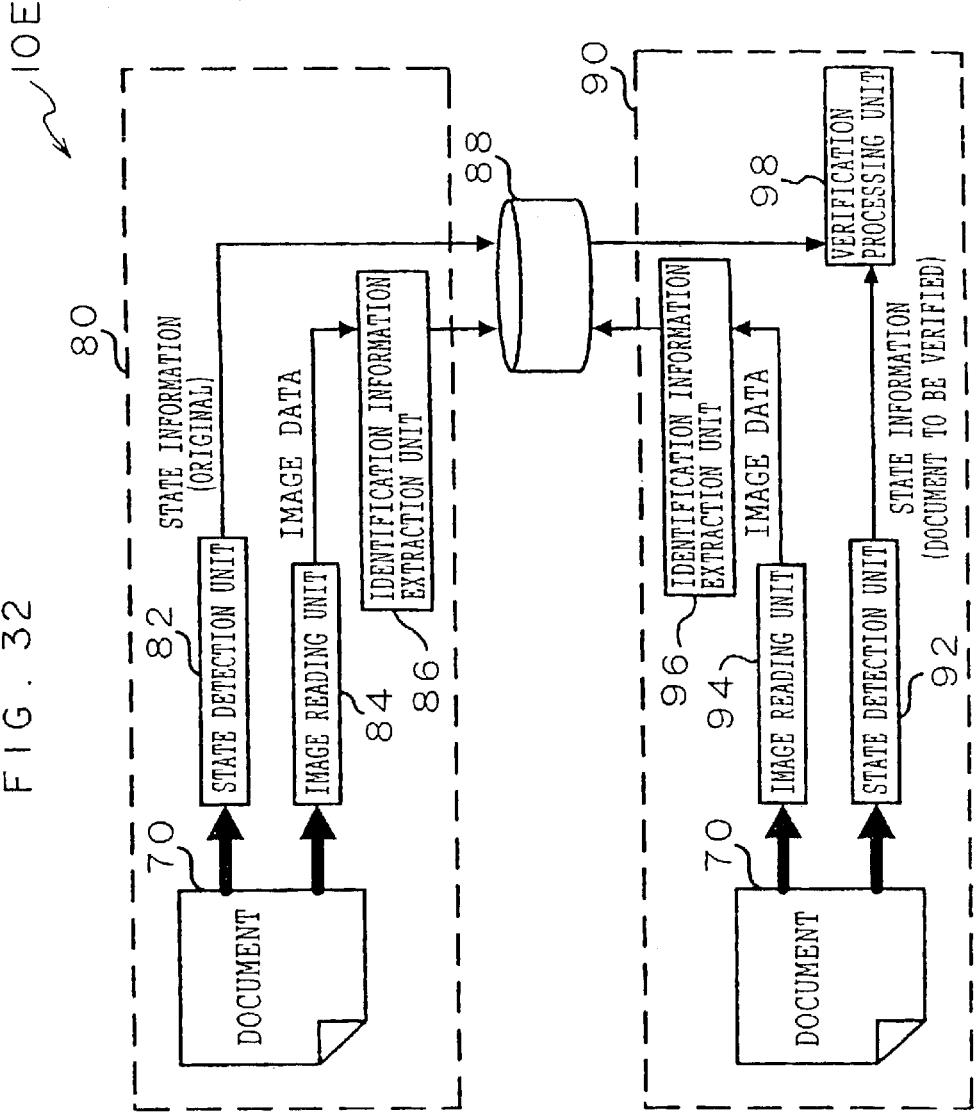
FIG. 32 is a block diagram showing a configuration of a document verification system in the case where state information that indicates at least one of a surface state and a thickness-expressing spots state of a non-printed region on a document serving as the original is applied as registration information of the present invention.

Hereafter, the case where the originality of a document is verified by using the surface state and/or the thickness-expressing spots state of paper used for the document will be described. FIG. 32 shows an example of a configuration of a document verification system in this case.

In a document verification system 10E shown in FIG. 32, an information registration device 80 for registering state information, which represents the surface state and/or the thickness-expressing spots state of the document 70 serving as the original, and a document verification device 90 for verifying whether the document 70 to be verified is the original are connected to a memory 88 via a network or the like.

The information registration device 80 includes a state detection unit 82 for detecting the state of paper used for the document 70 serving as the original, an image reading unit 84 for reading an image from the document 70, and an identification information extraction unit 86 for extracting identification information recorded previously on the document 70 from a result of reading conducted by the image reading unit 84. State information representing the state detected by the state detection unit 82 is stored in the memory 88.

In the information registration device 80, the units may be mounted on a single device, or at least one unit may be formed as a physically separate device and connected to a device including other units via a connection component such as a cable.

The state detection unit 82 detects at least one of the surface state and the thickness-expressing spots state of paper used for the document 70. A result of the detection is a set of detected values in a predetermined detection region, and it is acquired in the form of, for example, image data.

To be more precise, the surface state of paper can be observed by irradiating a non-image recording portion of the document 70 with light and detecting reflected light by using CCD devices or the like. For detecting the surface state efficiently, it is desirable to apply light to the paper of the document 70 obliquely so as to make unevenness of the surface appear as shadows and detect light reflected in a direction substantially perpendicular to the paper of the document 70. The inclination of irradiation light with respect to the document 70 becomes larger than that of irradiation light of the image reading unit 84 described later (i.e., the incidence angle becomes larger). In order to detect dust that has adhered to the surface or flaw, dark visual field illumination is utilized from the past. Detection of the surface state of paper may be conducted under the dark visual field illumination.

The thickness-expressing spots state of paper can be observed by irradiating a non-image recording portion of the document 70 with light and detecting transmitted light by using CCD devices or the like. In this case, it is possible to apply light to paper of the document 70 substantially at right angles and detect light that goes straight in the paper of the document 70 and that is transmitted through the paper.

As the wavelength of light with which paper is irradiated becomes shorter, reflection at the paper surface increases, as generally known. As the wavelength becomes longer, reflection at the paper surface decreases and the quantity of light penetrating into the paper increases. For detecting the surface state of paper, it is desirable to irradiate paper with light having a short wavelength. For detecting the thickness-expressing spots state of paper, it is desirable to irradiate paper with light having a long wavelength. To be more precise, existing light sources typically output light in the range from the near infrared ray region (approximately 950 nm) to the near ultraviolet region (approximately 370 nm). In this wavelength region, therefore, it is desirable to irradiate the document 70 with light in the near ultraviolet ray region when detecting the surface state of paper, and irradiate the document 70 with light in the near infrared ray region when detecting the thickness-expressing spots state of paper.

The portion (detection region) of the document 70 irradiated with light for state detection may be an image recording portion. Since reflected light or transmitted light from the image recording portion contains image information as well, a non-image recording portion is desirable.

As for the image reading unit 84, it is possible to utilize an image reading unit (the so-called scanner) typically utilized as a peripheral device of a PC (personal computer). To be more precise, an image recorded on the document 70 is read by irradiating the document 70 with light and detecting its reflected light. If light is applied to the paper of the document at right angles when reading an image from the document, then in general shining is caused on the document by the direct reflected light. In the image reading unit 84, therefore, it is desirable to apply light to the document paper at an angle having a predetermined inclination (i.e., incidence angle≠0) in order to prevent the shining. In the image reading unit 84, image data representing the read image are acquired. As occasion demands, the image data can be transmitted to an electronic information device such as a PC (personal computer), subjected to electronic filing of the document image or an OCR (Optical Character Recognition) algorithm, and utilized as character information.

The image reading unit 84 is connected to the identification information extraction unit 86. The identification information extraction unit 86 extracts the document ID information DID provided for the document 70 serving as the original in a bar code form or the like in the same way as the foregoing description, from the image data acquired by the image reading unit 84.

The state detection unit 82 and the identification information extraction unit 86 are connected to the memory 88. In the memory 88, state information indicating the state detected from the document 70 serving as the original by the state detection unit 82 is stored as registration information so as to be associated with the document ID information DID extracted from the document 70 by the identification information extraction unit 86. In other words, the state information of the original document 70 is stored in the memory 88 so as to be associated uniquely with the document 70.

On the other hand, the document verification device 90 includes a state detection unit 92 for detecting the state of paper used for the document 70 to be verified, an image reading unit 94 for reading an image from the document 70, an identification information extraction unit 96 for extracting identification information previously recorded on the document 70 from a result of reading conducted by the image reading unit 94, and an verification processing unit 98 for verifying whether the document 70 is genuine or spurious (original or non-original) on the basis of the state detected by the state detection unit 92 and the state information registered in the memory 88. The state detection unit 92, the image reading unit 94 and the identification information extraction unit 96 may be the same as the state detection unit 82, the image reading unit 84 and the identification information extraction unit 86, and consequently detailed description of them will be omitted.

The verification processing unit 98 is connected to the state detection unit 92. The state information indicating the state detected from the document 70 to be verified is input from the state detection unit 92 to the verification processing unit 98 as verification information. The verification processing unit 98 is connected to the memory 88 as well. Registered information in the memory 88 is arbitrarily read out and input to the verification processing unit 98. To be more precise, in the document verification device 90, state information stored in the memory 88 so as to be associated with the same document ID information DID as the document ID information DID extracted from the document 70 to be verified, by the identification information extraction unit 96 is read out and input to the verification processing unit 98.

By comparing the state information input from the state detection unit 92 with the state information read out from the memory 88 and input thereto, the verification processing unit 98 can determine whether the document 70 is the original, i.e., whether the document 70 is genuine or spurious, on the basis of the degree of resemblance. The degree of resemblance may be derived in the same way as the case where the feature of the nonreproducible disorder portion of the image described earlier is used. In order to permit some deviation in state detection region on the document 70 between the information registration device 80 and the document verification device 90, the following method may be used. A region in which one of the state information acquired by the state detection unit 82 in the information registration device 80 and the state information acquired by the state detection unit 92 in the information verification device 90 is detected is made different in detection size from a region in which the other of them is detected so as to make the latter cited region include the former cited region. The degree of resemblance between one state information state and the other state information is derived a plurality of times while moving the position of a region having the same size as that of the cut-out region in the other state information. If a maximum value of the derived degree of resemblance is at least a predetermined value, then the document to be verified is decided to be the original.

For example, it is now supposed that a correlation value is used as the degree of resemblance. If state information is acquired as a set of detected values corresponding to 64 by 64 pixels on the information registration device 80 side, then the state information X can be represented by a two-dimensional data arrangement having elements x(i,j) (i,j=0, 1, ..., 63). If on the information verification device 90 side the state information is acquired as a set of detected values corresponding to 128 by 128 pixels, then the state information Y can be represented by a two-dimensional data arrangement having elements y(k,l) (k,l 0, 1, ..., 127). Between x(i,j) and y(k,l), elements r(m,n) (m,n =0, 1, ..., 64) of normalized correlation R are derived by the following equation (1).

$$r(m, n) = \frac{\sum_{i=0}^{63} \sum_{j=0}^{63} \{x(i, j) - xm\}\{y(i+m, j+n) - ym(m, n)\}}{\sqrt{\sum_{i=0}^{63} \sum_{j=0}^{63} \{x(i, j) - xm\}^2} \sqrt{\sum_{i=0}^{63} \sum_{j=0}^{63} \{y(i+m, j+n) - ym(m, n)\}^2}} \quad \text{wherein } xm = \frac{\sum_{i=0}^{63} \sum_{j=0}^{63} x(i, j)}{64 \times 64}, \quad ym(m, n) = \frac{\sum_{i=0}^{63} \sum_{j=0}^{63} y(i+m, j+n)}{64 \times 64} \tag{1}$$

As elements r(m,n) of normalized correlation R thus derived increases in value, the degree of resemblance becomes high. Therefore, if a maximum value rmax among the elements r(m,n) of the normalized correlation R is at least a predetermined threshold, then the document 70 to be verified can be decided to be the original. If the maximum value rmax is less than the predetermined threshold, then the document 70 to be verified can be decided not to be the original.

In this case, the memory 88 corresponds to an information storage device of the invention, and the information registration device 80 corresponds to an information registration device of the invention. The document verification device 90 corresponds to a document verification device of the invention.

The flow of processing (see FIG. 14, FIG. 21, FIG. 22, FIG. 23, FIG. 26, FIG. 27 and FIG. 28) described in each of the embodiments is an example, and it can be altered suitable without departing from the spirit of the invention.

Furthermore, in the embodiments, configurations of devices and databases are merely examples, and they can be altered without departing from the spirit of the invention.

What is claimed is:

1. A document verification system for verifying whether a document is an original, the system comprising:

an information storage device;

an information registration device including a registration information acquisition component for acquiring, as registration information, at least one of feature information, indicating a feature of a nonreproducible disorder portion in a printing region on a document serving as an original, and state information, indicating at least one of a surface state and a thickness-expressing spots state, in a non-printing region on the document and a storage processing component for storing the registration information acquired by the registration information acquisition component in the information storage device; and a document verification device including an verification information acquisition component, for acquiring, as ascertainment information, information corresponding to the registration information in the document to be verified, a readout component for reading out the registration information from the information storage device, and an verification component for comparing the verification information acquired by the verification information acquisition component with the registration information read out by the readout component and verifying whether the document to be verified is the original on the basis of a result of the comparison.

2. The document verification system of claim 1, wherein at least one set of the information storage device, the information registration device and the document verification device is connected via a network.

3. The document verification system of claim 1, wherein the information registration device further includes a condition information acquisition component for acquiring condition information, which indicates conditions at the time when the registration information acquired by the registration information acquisition component was obtained from a document serving as the original, and a condition information storage processing component for storing the condition information acquired by the condition information acquisition component in the information storage device, and the document verification device further includes a condition information readout component for reading out the condition information from the information storage device, and a correction component for correcting the verification information acquired by the verification information acquisition component on the basis of the condition information read out by the condition information readout component.

4. The document verification system of claim 1, wherein the feature information is information indicating a scattering state of an image forming material for the document serving as the original and/or information indicating a state of penetration nonuniformity of the image forming material for the document.

5. The document verification system of claim 1, wherein the state information is information obtained by receiving at least one of reflected light from the document serving as the original and transmitted light through the document serving as the original.

6. The document verification system of claim 1 further comprising:

a recording device comprising an identification information recording component for recording, on the document serving as the original, identification information capable of identifying a document; and a readout device comprising an identification information readout component for reading out the identification information of a document to be verified, wherein the storage processing component in the information registration device further stores the identification information, which was recorded on the document serving as the original by the identification information recording component in the recording device in the information recording device, so as to be associated with the registration information on the document, and the readout component in the document verification device reads out, from the information storage device, registration information associated with identification information corresponding to the identification information read out by the identification information readout component in the readout device.

7. The document verification system of claim 1, wherein the information storage device associates and further stores position information, which indicates installation positions of the information registration device and the document verification device, and device identification information capable of identifying the information registration device and the document verification device, and each of the information registration device and the document verification device further includes a device identification information storage component for storing the corresponding device identification information, and a device identification information transmission component for transmitting the device identification information stored in the device identification information storage component to the outside.

8. A document verification method for verifying whether a document is an original, the method comprising the steps of:

acquiring, as registration information, at least one of feature information indicating a feature of a nonreproducible disorder portion in a printing region on a document serving as an original and state information indicating at least one of a surface state and a thickness-expressing spots state, in a non-printing region on the document, and storing the registration information in the information storage device, by using an information registration device; and acquiring, as verification information, information corresponding to the registration information in a document to be verified, reading out the registration information from the information storage device, comparing the acquired verification information with the read out registration information and verifying whether the document to be verified is the original on the basis of a result of the comparison, by using a document verification device.

9. The document verification method of claim 8, wherein the feature information is at least one of information indicating a scattering state of an image forming material for the document serving as the original and information indicating a state of penetration nonuniformity of the image forming material for the document.

10. The document verification method of claim 8, wherein the state information is at least one of information obtained by receiving at least one of light reflected and light transmitted through the document serving as the original.

11. An information registration device for registering in an information storage device, information used to verify whether a document is an original the information registration device comprising:

a registration information acquisition component for acquiring, as registration information, at least one of feature information indicating a feature of a nonreproducible disorder portion in a printing region on a document serving as an original and state information indicating at least one of a surface state and/or a thickness-expressing spots state in a non-printing region on the document; and a storage processing component for storing the registration information in the information storage device.

12. The information registration device of claim 11, wherein the feature information is at least one of information indicating a scattering state of an image forming material for the document serving as the original and information indicating a state of penetration nonuniformity of the image forming material for the document.

13. The information registration device of claim 11, wherein the state information is at least one of information obtained by receiving at least one of light reflected from the document serving as the original and light transmitted through the document serving as the original.

14. A recording medium comprising an information registration instruction recorded thereon, the information registration instruction causing a computer to execute processing of registering, in an information storage device, information used to verify whether a document is an original, the information registration instruction comprising the steps of:

acquiring, as registration information, at least one of feature information indicating a feature of a nonreproducible disorder portion in a printing region on a document serving as an original and state information indicating at least one of a surface state and a thickness-expressing spots state in a non-printing region on the document; and storing the registration information in the information storage device.

15. A document verification device for verifying whether or not a document is the original by reading out registration information from an information storage device, in which at least one of feature information indicating a feature of a nonreproducible disorder portion in a printing region of a document serving as an original and state information indication at least one of a surface state and a thickness-expressing spots state in a nonprinting region in the document has been registered as the registration information the document device comprising:

an verification information acquisition component for acquiring, as verification information, information corresponding to the registration information in a document to be verified;

a readout component for reading out the registration information from the information storage device; and an verification component for comparing the verification information acquired by the verification information acquisition component with the registration information read out by the readout component, and verifying whether the document to be verified is the original on the basis of a result of the comparison.

16. The document verification device of claim 15, wherein the feature information is at least one of information indicating a scattering state of an image forming material for the document serving as the original and information indicating a state of penetration nonuniformity of the image forming material for the document.

17. The document verification device of claim 15, wherein the state information is at least one of information obtained by receiving at least one of light reflected from the document serving as the original and light transmitted through the document serving as the original.

18. A recording medium comprising a document verification instruction recorded thereon, the document verification instruction causing a computer to execute processing for verifying whether or not a document is the original by reading out registration information from an information storage device, in which at least one of feature information indicating a feature of a nonreproducible disorder portion in a printing region of a document serving as an original and state information indication at lest one of a surface state and a thickness-expressing spots state in a nonprinting region in the document has been registered as the registration information, the document verification instruction comprising the steps of:

acquiring, as verification information, information corresponding to the registration information in a document to be verified;

reading out the registration information from the information storage device; and comparing the verification information acquired at the verification information acquisition step with the registration information read out at the readout step, and verifying whether the document to be verified is the original on the basis of a result of the comparison.

19. A document verification database used to verify whether a document is an original, wherein at least one of feature information indicating a feature of a nonreproducible disorder portion in a printing region on a document serving as an original and state information indicating at least one of a surface state and a thickness-expressing spots state in a non-printing region on the document is registered in the document verification database as registration information.

* * * * *